(12) United States Patent
Estrada et al.

(10) Patent No.: US 10,636,169 B2
(45) Date of Patent: *Apr. 28, 2020

(54) SYNTHESIZING TRAINING DATA FOR BROAD AREA GEOSPATIAL OBJECT DETECTION

(71) Applicant: DIGITALGLOBE, INC., Westminster, CO (US)

(72) Inventors: Adam Estrada, Bethesda, MD (US); Christopher Burd, Washington, DC (US); Andrew Jenkins, Waterford, VA (US); Joseph Newbrough, Springfield, VA (US); Scott Szoko, Odenton, MD (US); Melanie Vinton, Fairfax Station, VA (US)

(73) Assignee: DIGITALGLOBE, INC., Longmont, CO (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/224,400

(22) Filed: Dec. 18, 2018

(65) Prior Publication Data

US 2019/0385338 A1    Dec. 19, 2019

Related U.S. Application Data

(63) Continuation of application No. 15/709,252, filed on Sep. 19, 2017, now Pat. No. 10,157,479, which is a
(Continued)

(51) Int. Cl.
*G06K 9/62* (2006.01)
*G06T 7/73* (2017.01)
(Continued)

(52) U.S. Cl.
CPC ............ *G06T 7/75* (2017.01); *G06K 9/00637* (2013.01); *G06K 9/6256* (2013.01); *G06K 9/6267* (2013.01); *G06N 3/04* (2013.01); *G06N 3/0454* (2013.01); *G06N 3/08* (2013.01); *G06T 5/009* (2013.01); *G06T 7/73* (2017.01);
(Continued)

(58) Field of Classification Search
CPC .......... G06N 3/08; G06N 3/04; G06K 9/6267; G06K 9/0063; G06T 2207/20081; G06T 7/344; G06T 2207/20084; G06T 2207/10032
See application file for complete search history.

(56) References Cited

U.S. PATENT DOCUMENTS 10,157,479 B2 *   12/2018   Estrada ................ G06K 9/6267

* cited by examiner

*Primary Examiner* — Samir A Ahmed
(74) *Attorney, Agent, or Firm* — Brian R. Galvin; Galvin Patent Law LLC

(57) ABSTRACT

A system for broad area geospatial object recognition, identification, classification, location and quantification, comprising an image manipulation module to create synthetically-generated images to imitate and augment an existing quantity of orthorectified geospatial images; together with a deep learning module and a convolutional neural network serving as an image analysis module, to analyze a large corpus of orthorectified geospatial images, identify and demarcate a searched object of interest from within the corpus, locate and quantify the identified or classified objects from the corpus of geospatial imagery available to the system. The system reports results in a requestor's preferred format.

3 Claims, 13 Drawing Sheets

Related U.S. Application Data continuation of application No. 15/194,541, filed on Jun. 27, 2016, now Pat. No. 9,767,565, which is a continuation-in-part of application No. 14/835,736, filed on Aug. 26, 2015, now Pat. No. 9,589,210.

(60) Provisional application No. 62/301,554, filed on Feb. 29, 2016.

(51) Int. Cl.
| | |
|---|---|
| *G06N 3/08* | (2006.01) |
| *G06N 3/04* | (2006.01) |
| *G06K 9/00* | (2006.01) |
| *G06T 15/50* | (2011.01) |
| *G06T 17/05* | (2011.01) |
| *G06T 7/90* | (2017.01) |
| *G06T 5/00* | (2006.01) |

(52) U.S. Cl.
CPC ............... *G06T 7/90* (2017.01); *G06T 15/50* (2013.01); *G06T 17/05* (2013.01); *G06T 2207/10032* (2013.01); *G06T 2207/20081* (2013.01)

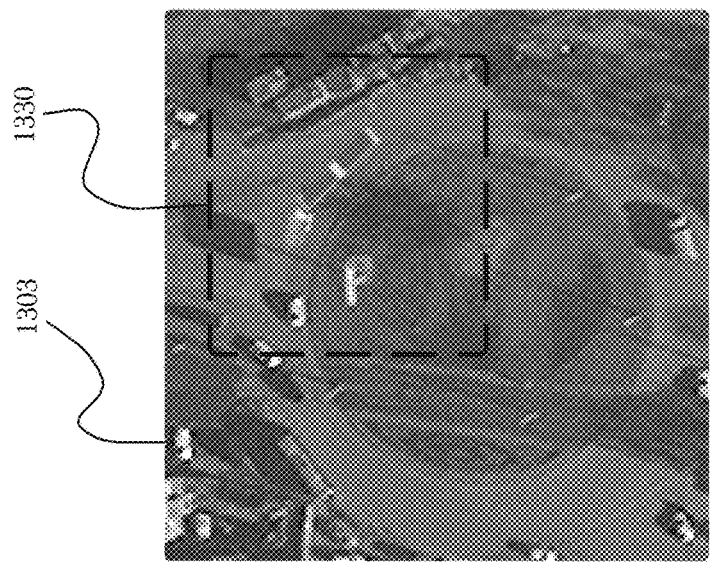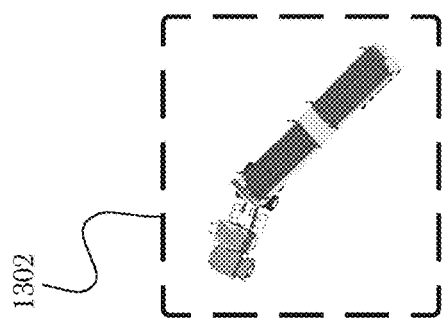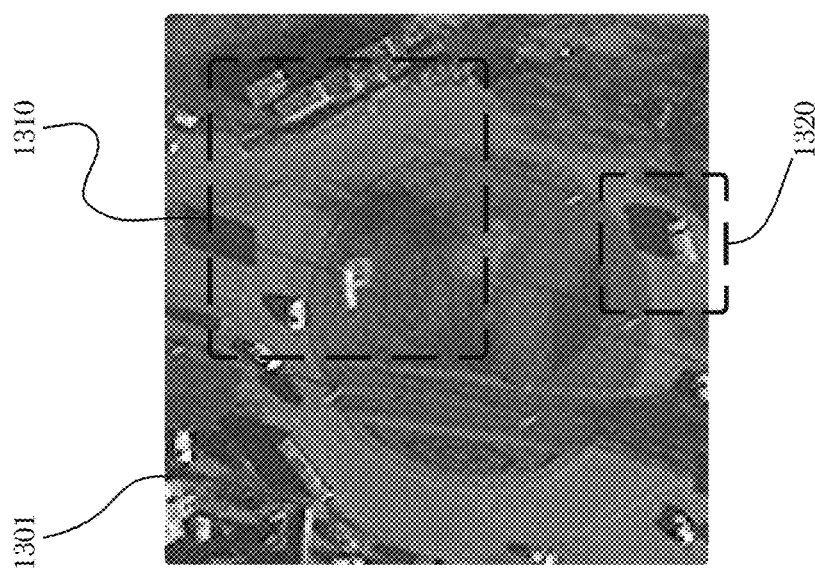
Fig. 13

SYNTHESIZING TRAINING DATA FOR BROAD AREA GEOSPATIAL OBJECT DETECTION

CROSS-REFERENCE TO RELATED APPLICATIONS

This application is a continuation of U.S. patent application Ser. No. 15/709,252 titled "SYNTHESIZING TRAINING DATA FOR BROAD AREA GEOSPATIAL OBJECT DETECTION", filed on Sep. 19, 2017, which is a continuation of U.S. patent application Ser. No. 15/194,541 titled "SYNTHESIZING TRAINING DATA FOR BROAD AREA GEOSPATIAL OBJECT DETECTION", filed on Jun. 27, 2016, which is a continuation-in-part of U.S. patent application Ser. No. 14/835,736, titled "BROAD AREA GEOSPATIAL OBJECT DETECTION USING AUTO-GENERATED DEEP LEARNING MODELS" filed on Aug. 26, 2015, now issued as U.S. Pat. No. 9,589,210 on Mar. 7, 2017, and also claims the benefit of and priority to U.S. provisional patent application Ser. No. 62/301,554, titled "SYNTHESIZING TRAINING DATA FOR BROAD AREA GEOSPATIAL OBJECT DETECTION", filed on Feb. 29, 2016, the entire specification of each of which is incorporated herein by reference in their entirety.

BACKGROUND OF THE INVENTION

Field of the Art

The present invention is in the field of image analysis, and more particularly in the field of the use of deep learning model computer vision systems for automated object identification from geospatial imagery.

Discussion of the State of the Art

Image analysis has been an important field of technology at least since the period of World War 2, when extensive use of image analysis, photogrammetry, and related technologies were used in conjunction with aerial photography for intelligence and bombing damage assessment purposes (among others). However, the extent of the use of image analysis (particularly image analysis of remotely-sensed images), particularly for identifying or locating targets of interest, has always been limited by the need for highly-trained, specialized image analysts or interpreters. The need for specialized (and expensive) skills has limited the use of image analysis to a correspondingly limited range of applications (notably military, homeland defense, and law enforcement).

The market for image analysis has also historically been limited by the high cost of obtaining images to analyze. In the military arena, the benefits were sufficiently apparent that large numbers of military reconnaissance flights have been made over regions of interest since World War 2. But the cost of such flights virtually excluded all commercial applications of image analysis. Starting in the 1970s with the Landsat satellite, this began to change as low resolution satellite images became publicly available. A series of new satellites has opened up progressively more applications as the resolution, spectral coverage, geographic coverage, and cost per image have all continuously improved; accordingly, a significant market in commercial remote sensing imagery has emerged. But even this market has been limited from achieving its full potential because of the still-present requirement for expensive, scarce image analysis talent.

One common type of geospatial image analysis task is the "search and locate" task. In this task, one or more targets of interest need to be identified and precisely located. A well known example of "search and locate" is the discovery and pinpointing of warships, tanks, or other military targets of interest. Recently, focused geospatial image analysis of geographically specific data has been used for search and rescue efforts of downed planes or lost shipping. However, these efforts have required the work of image analysts, limiting what could be done. Development of a method to identify targets of interest rapidly, using less resources would allow the pursuit of less urgent but promising applications which include assessing the scope of a refugee crisis by for example counting tents in an area of interest, analyzing the change in infrastructure in developing nations, assessing numbers of endangered species, finding military hardware in areas previously not expected to contain such equipment, identifying previously unknown airstrips or camps where crime or terrorism may be in operation. The ability to extend "search and locate" like tasks to large geological areas and efficiently perform them repetitively over time would allow the use of geospatial imagery to map remote regions, to track deforestation and re-forestation and to detect natural disasters in remote areas of the world.

The notion of computer vision, specifically the reliable identification by a computer of particular objects has been an active pursuit within the field of computer science since the late 1960s. Unfortunately, until recently, this pursuit has met with little success except when both the object of interest and the background against which it is presented have been tightly controlled. Barriers to advancement in computer object identification have been both technological and logical. The technological barriers have been present because, like its biological counterpart, computer visual processing requires computational power and amounts of memory storage that have been prohibitive up until the last 15 years. Advancement in the ability to pack more transistors into the same volume while also reducing cost and the development of such specialized components as the graphics processing unit, which is optimized to perform calculations encountered during manipulation of visual data has brought current hardware to the point where rapid, even real time, object identification is possible. There has also been a significant maturation process in how computer scientists in the field program computers to analyze objects of interest. Some of these early methods have been to break each object of interest into a unique grouping of simple geometric shapes or to take advantage of unique shading patterns of each object to identify new instances of the desired object. All of these early attempts gave results that were extremely sensitive to such variables as lighting, exact object placement in the field of sample, and exact object orientation, sometimes to the degree that the object of interest was not identifiable in the original image without great care. Currently, after great advancement in computer capabilities, advances in our understanding of biological vision, and advances in computer vision theory, a method of training computers to reliably identify specific objects of interest has emerged. This method combines a convolutional neural network with deep learning to train the system to recognize an existing object of interest both when presented against many backgrounds and when the object is in different orientations. The convolutional neural network which consists of several layers of filters with partial, local field interconnections between layers interspersed with data complexity reduction pooling layers affords computer learning of object recognition with a minimum of pre-supposition on the part of the programmer as the convolutional neural network determines the best filters to use to identify the target object. Deep learning consists of a period of "supervised learning" which uses a moderate sized set of training images where each image contains an example of the object to identify, for example, the human face, which is clearly demarcated or "labeled" followed by a period of "unsupervised learning" on a very large number of unlabeled images, a portion of which do not have the object to identify present. The number of training images is proportional to the overall system's accuracy, specifically the precision and recall of the classification results. Accordingly, the number of training images is inversely proportional to the amount of time the convolutional neural network—deep learning model spends training and further, searching and accurately finding objects of interest. This convolutional neural network—deep learning model method has given rise to computer systems that have been reliably used in human facial recognition, optical character recognition, and identification of complex sets of parts during manufacturing. Indeed, the convolutional neural network-deep learning model method has been found so widely useful for object identification that there are multiple programming libraries now publicly available for download and use for that purpose. These include, for example, the Caffe library (BerkeleyVision and Learning Center), the Torch7 library (Nagadomi) and the cuda-covnet2 library (Alex Krizhevsky). While the convolutional neural network-deep learning model method has been widely and very successfully applied to ground based photography and video, it has not found application in the field of geospatial image analysis.

What is needed in the art is an automated system that generates synthetic training images to augment the number of real training images needed for an automated system to both identify and determine the precise location of a number of objects of interest from geospatial imagery.

SUMMARY OF THE INVENTION

The inventor has developed a computing system for analysis of satellite images to geolocate one or more targets of interest, or to identify objects or their types.

According to a preferred embodiment of the invention, a system for broad area geospatial object detection using synthetically generated training images comprising an image manipulation software module, a deep learning model training software module and, a convolutional neural network serving as an image analysis software module. Following a search prompt for an object of interest, the image manipulation software module: retrieves a 3-dimensional modeled replica of the object of interest from an established data store; creates a flattened, nadir directional 2-dimensional image from the 3-dimensional model; compares the flattened image to a real geospatial image and its associated background of the same object of interest; scales the flattened modeled image to align with the real geospatial image of the same object and upon successful alignment, separates the modeled image from the background of the real image in order to fine tune components of the flattened modeled image, which may include smoothing edges and/or color matching to assimilate the real image; applies a plurality of environmental effects to replicate seasonal, timestamps, associated brightness, and environmental factors consistent with a geographic location of the real background image to create a plurality of modified synthetic images; creates a plurality of shadowed, modified 2-dimensional synthetic images for the 3-dimensional object as if it were physically located and oriented where it would be affected by real-time and real-world shadowing; compares and adjusts the shadowed, modified synthetic 2-dimensional images by pixelating and blurring or focusing to resemble the real image; identifies and demarcates a footprint associated with each of the shadowed, modified synthetic 2-dimensional images; overlays the demarcated footprint onto a real image and masks the background colors surrounding the synthetic image to become transparent such that overlay onto the real image does not obscure existing images to create a manipulated synthetic image; and generates a labeled corpus of manipulated synthetic training data comprising a plurality of modified images for use by a deep learning model training software module. The deep learning model training software module receives training data comprising a plurality of both synthetic, manipulated images and real orthorectified geospatial images with a plurality of objects present therein, a first subset of the plurality of objects being a labeled corpus including the synthetic training data and a second subset of objects being unlabeled; aggregates the training data and classifies the training data into a plurality of predefined categories; optimizes the training data for deep learning model training; discards images unsuitable for analysis; and generates an object classification model by using a deep learning method comprising separate processing of the first and second subsets of the training data through a convolutional neural network system. The convolutional neural network system working as an image analysis software module uses the object classification model generated from the deep learning model training software module to automatically identify and label all objects of interest as a featured item or plurality of items within a received data set comprising a plurality of unanalyzed orthorectified geospatial imagery, regardless of the orientation or scale of the featured item within the section, and accounting for differences in item scale by using a multi-scale sliding window algorithm; and outputs the locations of the identified objects of interest in a form dictated by the parameters of the original search request.

According to another preferred embodiment of the invention, a method for an automated system to identify, classify, locate and quantify an object of interest from geospatial imagery, regardless of quantity of existing images of the object of interest, within a given set of geospatial images, comprising the following steps: creating a large corpus of synthetically generated training images, of which only a small number of real images exist, by generating a realistic 2-dimensional image of an object of interest from a replica of the same object of interest; using an image manipulation software module, and manipulating the synthetically generated 2-dimensional image to create a plurality of synthetic images of the object of interest, placing the synthetic image in a plurality of locations, environments, orientations, scales, exposures, and foci in order to create a large corpus of training images for use by a deep learning training module; creating a classification engine using the deep learning training module by using synthetic training images as labeled images to train the deep learning module how to identify and classify the object within a plurality of sets of unlabeled images; and analyzing a large set of unlabeled images using a convolutional neural network serving as an image analysis software module to compare labeled images to unlabeled images, thus generating an output file in a requestor's preferred format, comprising location, classification, and quantity of the searched object of interest.

BRIEF DESCRIPTION OF THE DRAWING FIGURES

The accompanying drawings illustrate several embodiments of the invention and, together with the description, serve to explain the principles of the invention according to the embodiments. One skilled in the art will recognize that the particular embodiments illustrated in the drawings are merely exemplary, and are not intended to limit the scope of the present invention.

Figure 1:
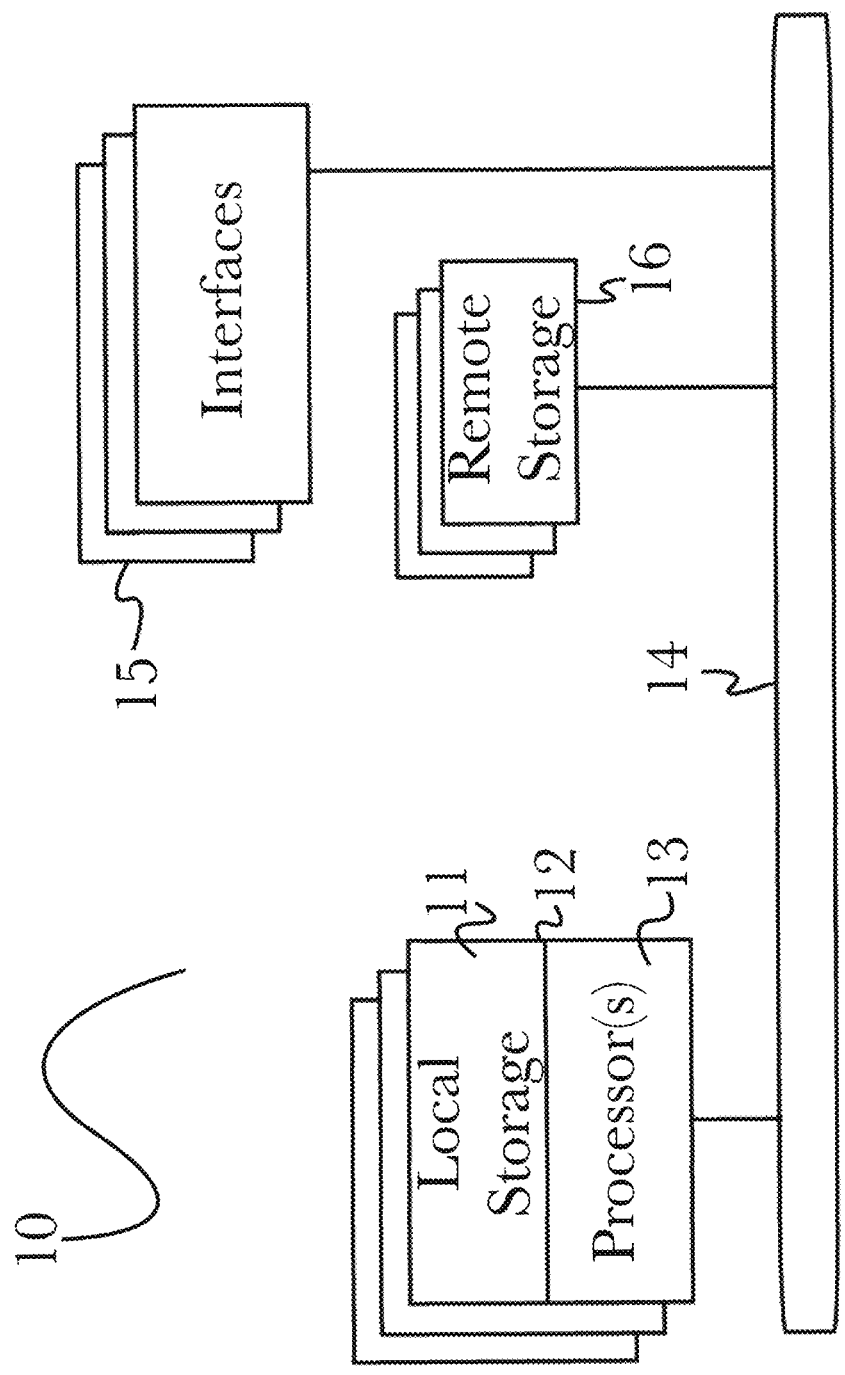
FIG. 1 is a block diagram illustrating an exemplary hardware architecture of a computing device used in various embodiments of the invention.

FIG. 13 comprises three images which exemplify how a synthetic modeled image may be overlain on existing imagery to create synthetic geospatial images.

DETAILED DESCRIPTION

The inventor has conceived, and reduced to practice, various systems and methods for advanced broad area geospatial object detection using autogenerated deep learning models trained by actual and/or virtual images.

One or more different inventions may be described in the present application. Further, for one or more of the inventions described herein, numerous alternative embodiments may be described; it should be understood that these are presented for illustrative purposes only. The described embodiments are not intended to be limiting in any sense. One or more of the inventions may be widely applicable to numerous embodiments, as is readily apparent from the disclosure. In general, embodiments are described in sufficient detail to enable those skilled in the art to practice one or more of the inventions, and it is to be understood that other embodiments may be utilized and that structural, logical, software, electrical and other changes may be made without departing from the scope of the particular inventions. Accordingly, those skilled in the art will recognize that one or more of the inventions may be practiced with various modifications and alterations. Particular features of one or more of the inventions may be described with reference to one or more particular embodiments or figures that form a part of the present disclosure, and in which are shown, by way of illustration, specific embodiments of one or more of the inventions. It should be understood, however, that such features are not limited to usage in the one or more particular embodiments or figures with reference to which they are described. The present disclosure is neither a literal description of all embodiments of one or more of the inventions nor a listing of features of one or more of the inventions that must be present in all embodiments.

Headings of sections provided in this patent application and the title of this patent application are for convenience only, and are not to be taken as limiting the disclosure in any way.

Devices that are in communication with each other need not be in continuous communication with each other, unless expressly specified otherwise. In addition, devices that are in communication with each other may communicate directly or indirectly through one or more intermediaries, logical or physical.

A description of an embodiment with several components in communication with each other does not imply that all such components are required. To the contrary, a variety of optional components may be described to illustrate a wide variety of possible embodiments of one or more of the inventions and in order to more fully illustrate one or more aspects of the inventions. Similarly, although process steps, method steps, algorithms or the like may be described in a sequential order, such processes, methods and algorithms may generally be configured to work in alternate orders, unless specifically stated to the contrary. In other words, any sequence or order of steps that may be described in this patent application does not, in and of itself, indicate a requirement that the steps be performed in that order. The steps of described processes may be performed in any order practical. Further, some steps may be performed simultaneously despite being described or implied as occurring non-simultaneously (e.g., because one step is described after the other step). Moreover, the illustration of a process by its depiction in a drawing does not imply that the illustrated process is exclusive of other variations and modifications thereto, does not imply that the illustrated process or any of its steps are necessary to one or more of the invention(s), and does not imply that the illustrated process is preferred. Also, steps are generally described once per embodiment, but this does not mean they must occur once, or that they may only occur once each time a process, method, or algorithm is carried out or executed. Some steps may be omitted in some embodiments or some occurrences, or some steps may be executed more than once in a given embodiment or occurrence.

When a single device or article is described, it will be readily apparent that more than one device or article may be used in place of a single device or article. Similarly, where more than one device or article is described, it will be readily apparent that a single device or article may be used in place of the more than one device or article.

The functionality or the features of a device may be alternatively embodied by one or more other devices that are not explicitly described as having such functionality or features. Thus, other embodiments of one or more of the inventions need not include the device itself.

Techniques and mechanisms described or referenced herein will sometimes be described in singular form for clarity. However, it should be noted that particular embodiments include multiple iterations of a technique or multiple instantiations of a mechanism unless noted otherwise. Process descriptions or blocks in figures should be understood as representing modules, segments, or portions of code which include one or more executable instructions for implementing specific logical functions or steps in the process. Alternate implementations are included within the scope of embodiments of the present invention in which, for example, functions may be executed out of order from that shown or discussed, including substantially concurrently or in reverse order, depending on the functionality involved, as would be understood by those having ordinary skill in the art.

Definitions

As used herein, "orthorectified geospatial image" refers to satellite imagery of the earth that has been digitally corrected to remove terrain distortions introduced into the image by either angle of incidence of a particular point from the center of the satellite imaging sensor or significant topological changes inherent to the region of the earth that the image depicts. This correction is accomplished using a digital elevation model. One example of a digital elevation model in use today is Shuttle Radar Topography Mission (SRTM) 90m DEM data set, but others of equal or greater precision have also been created using high definition stereoscopic satellite imagery of the same regions as are being analyzed or using topographical maps of sufficient detail available for that region. Geospatial images used as part of the invention may be orthorectified using digital elevation model datasets obtained by any method known to the art.

A "database" or "data storage subsystem" (these terms may be considered substantially synonymous), as used herein, is a system adapted for the long-term storage, indexing, and retrieval of data, the retrieval typically being via some sort of querying interface or language. "Database" may be used to refer to relational database management systems known in the art, but should not be considered to be limited to such systems. Many alternative database or data storage system technologies have been, and indeed are being, introduced in the art, including but not limited to distributed non-relational data storage systems such as Hadoop, column-oriented databases, in-memory databases, and the like. While various embodiments may preferentially employ one or another of the various data storage subsystems available in the art (or available in the future), the invention should not be construed to be so limited, as any data storage architecture may be used according to the embodiments. Similarly, while in some cases one or more particular data storage needs are described as being satisfied by separate components (for example, an expanded private capital markets database and a configuration database), these descriptions refer to functional uses of data storage systems and do not refer to their physical architecture. For instance, any group of data storage systems of databases referred to herein may be included together in a single database management system operating on a single machine, or they may be included in a single database management system operating on a cluster of machines as is known in the art. Similarly, any single database (such as an expanded private capital markets database) may be implemented on a single machine, on a set of machines using clustering technology, on several machines connected by one or more messaging systems known in the art, or in a master/slave arrangement common in the art. These examples should make clear that no particular architectural approaches to database management is preferred according to the invention, and choice of data storage technology is at the discretion of each implementer, without departing from the scope of the invention as claimed.

As used herein, "search and locate" refers to a general class of tasks wherein a set of images is searched for particular classes of stationary targets (such as buildings, tanks, railroad terminals, downed airplanes, etc.) or relocatable targets (such as missile launchers, aircraft carriers, oil rigs, earthmovers, tower cranes, etc). It is common that the set of images may be searched to find more than one class of targets (for example, to find all targets of military interest), although single target class searches may also be performed ("find all cars"). The second part of the search and locate task is to precisely locate any resulting targets of interest (where is the air base or refugee camp?).

As used herein, "image manipulation" refers to a way of generating artificial, "manipulated images" and respectively labeling them to simulate real geospatial images, such that a plurality of synthetic images can be automatically generated without the need for manual effort. Image manipulation greatly reduces the extensive manual effort currently required to extract and label existing data, even when it is relatively abundant. Further, image manipulation may be utilized to create synthetic data for an object class for rare or even theoretical items. By using synthetic data, any object that can be simulated, modeled or otherwise created by computer-aided design (CAD), can be searched by a preferred embodiment of the invention.

As referenced herein, "manipulated images" refer to synthetic images, which may be modeled, flattened, or otherwise virtually generated or modified images, to replicate real, existing orthorectified geospatial images created from image manipulation. These images can be used to generate a collection of training images for a searchable object class.

As used herein, "cache of pre-labeled geospatial images" refers to any source of a plurality of orthorectified geospatial image segments that have been pre-analyzed and have had instances of one or more objects of interest tagged or labeled in such a way that the recipient computer system is able to associate a specific region of that image with the object of interest for the purpose of subsequent identification of like objects. These images may be stored in an image database, either relational or flat file, or within a directory of image files, any of which may be stored on the same computer on which the images are being used, a storage device or storage system directly connected to that computer or may be on a computer or storage system connected to the recipient computer through any of the networking methods as are known in the art.

As used herein, "cache of multi-scale geospatial images" refers to any source of a plurality of overlapping orthorectified geospatial image segments that, due to optical differences at the time of capture or processing differences at the time of transmission, storage or analysis, show the same geographical region at different functional resolutions. There is the further requirement that the correspondence of coordinate system used to catalog these segments within the cache, whether proprietary or open, to standard geographic latitude and longitude coordinates be known so that the location being analyzed on a given image segment from the cache is known at all times. These images may be stored in an image database, either relational or flat file, or within a directory of image files, any of which may be stored on the same computer on which the images are being used, a storage device or storage system directly connected to that computer or may be on a computer or storage system connected to the recipient computer through any of the networking methods as are known in the art.

As used herein, "image analysis" refers to the analysis of images obtained from one or more image sensors; generally, a single analysis task focuses on a set of images of a single region of interest on the earth, but image analysis may be done on multiple contiguous regions as captured by several image sensors. Satellite and aerial imagery are common examples of imagery that are subjected to large scale image analysis.

As used herein "image correction and optimization module" refers to a set of programming functions that during its operation receives a plurality of orthorectified geospatial images from a cache of pre-labeled geospatial images, normalizes these images to account for image quality differences which include but are not limited to variations in color balance, brightness, and contrast. This module also analyzes images for aberrations which might include cloud cover, lens artifact, mechanical obstruction of portions of the image and the software within the module may then reject the image from analysis when certain pre-set thresholds are exceeded.

As used herein "category" refers to a set of specific objects that are of the same type and function, but which may vary to some degree in appearance. An example of this might be the United States Capitol Building, the White House and the Pentagon in Washington D.C. all appear different in geospatial images but are all in the category "buildings." Another example might be that the Airbus 310, Lockheed L1011, Boeing 727, Boeing 777 and Boeing 747 all differ in size and fine level configuration, but are all in the category "airliners."

Hardware Architecture

Generally, the techniques disclosed herein may be implemented on hardware or a combination of software and hardware. For example, they may be implemented in an operating system kernel, in a separate user process, in a library package bound into network applications, on a specially constructed machine, on an application-specific integrated circuit (ASIC), or on a network interface card.

Software/hardware hybrid implementations of at least some of the embodiments disclosed herein may be implemented on a programmable network-resident machine (which should be understood to include intermittently connected network-aware machines) selectively activated or reconfigured by a computer program stored in memory. Such network devices may have multiple network interfaces that may be configured or designed to utilize different types of network communication protocols. A general architecture for some of these machines may be described herein in order to illustrate one or more exemplary means by which a given unit of functionality may be implemented. According to specific embodiments, at least some of the features or functionalities of the various embodiments disclosed herein may be implemented on one or more general-purpose computers associated with one or more networks, such as for example an end-user computer system, a client computer, a network server or other server system, a mobile computing device (e.g., tablet computing device, mobile phone, smartphone, laptop, or other appropriate computing device), a consumer electronic device, a music player, or any other suitable electronic device, router, switch, or other suitable device, or any combination thereof. In at least some embodiments, at least some of the features or functionalities of the various embodiments disclosed herein may be implemented in one or more virtualized computing environments (e.g., network computing clouds, virtual machines hosted on one or more physical computing machines, or other appropriate virtual environments).

Referring now to FIG. 1, there is shown a block diagram depicting an exemplary computing device 10 suitable for implementing at least a portion of the features or functionalities disclosed herein. Computing device 10 may be, for example, any one of the computing machines listed in the previous paragraph, or indeed any other electronic device capable of executing software- or hardware-based instructions according to one or more programs stored in memory. Computing device 10 may be configured to communicate with a plurality of other computing devices, such as clients or servers, over communications networks such as a wide area network a metropolitan area network, a local area network, a wireless network, the Internet, or any other network, using known protocols for such communication, whether wireless or wired.

In one embodiment, computing device 10 includes one or more central processing units (CPU) 12, one or more interfaces 15, and one or more busses 14 (such as a peripheral component interconnect (PCI) bus). When acting under the control of appropriate software or firmware, CPU 12 may be responsible for implementing specific functions associated with the functions of a specifically configured computing device or machine. For example, in at least one embodiment, a computing device 10 may be configured or designed to function as a server system utilizing CPU 12, local memory 11 and/or remote memory 16, and interface(s) 15. In at least one embodiment, CPU 12 may be caused to perform one or more of the different types of functions and/or operations under the control of software modules or components, which for example, may include an operating system and any appropriate applications software, drivers, and the like.

CPU 12 may include one or more processors 13 such as, for example, a processor from one of the Intel, ARM, Qualcomm, and AMD families of microprocessors. In some embodiments, processors 13 may include specially designed hardware such as application-specific integrated circuits (ASICs), electrically erasable programmable read-only memories (EEPROMs), field-programmable gate arrays (FPGAs), and so forth, for controlling operations of computing device 10. In a specific embodiment, a local memory 11 (such as non-volatile random access memory (RAM) and/or read-only memory (ROM), including for example one or more levels of cached memory) may also form part of CPU 12. However, there are many different ways in which memory may be coupled to system 10. Memory 11 may be used for a variety of purposes such as, for example, caching and/or storing data, programming instructions, and the like. It should be further appreciated that CPU 12 may be one of a variety of system-on-a-chip (SOC) type hardware that may include additional hardware such as memory or graphics processing chips, such as a Qualcomm SNAPDRAGON™ or Samsung EXYNOS™ CPU as are becoming increasingly common in the art, such as for use in mobile devices or integrated devices.

As used herein, the term "processor" is not limited merely to those integrated circuits referred to in the art as a processor, a mobile processor, or a microprocessor, but broadly refers to a microcontroller, a microcomputer, a programmable logic controller, an application-specific integrated circuit, and any other programmable circuit.

In one embodiment, interfaces 15 are provided as network interface cards (NICs). Generally, NICs control the sending and receiving of data packets over a computer network; other types of interfaces 15 may for example support other peripherals used with computing device 10. Among the interfaces that may be provided are Ethernet interfaces, frame relay interfaces, cable interfaces, DSL interfaces, token ring interfaces, graphics interfaces, and the like. In addition, various types of interfaces may be provided such as, for example, universal serial bus (USB), Serial, Ethernet, FIREWIRE™, THUNDERBOLT™, PCI, parallel, radio frequency (RF), BLUETOOTH™, near-field communications (e.g., using near-field magnetics), 802.11 (WiFi), frame relay, TCP/IP, ISDN, fast Ethernet interfaces, Gigabit Ethernet interfaces, Serial ATA (SATA) or external SATA (ESATA) interfaces, high-definition multimedia interface (HDMI), digital visual interface (DVI), analog or digital audio interfaces, asynchronous transfer mode (ATM) interfaces, high-speed serial interface (HSSI) interfaces, Point of Sale (POS) interfaces, fiber data distributed interfaces (FDDIs), and the like. Generally, such interfaces 15 may include physical ports appropriate for communication with appropriate media. In some cases, they may also include an independent processor (such as a dedicated audio or video processor, as is common in the art for high-fidelity A/V hardware interfaces) and, in some instances, volatile and/or non-volatile memory (e.g., RAM).

Although the system shown and described above illustrates one specific architecture for a computing device 10 for implementing one or more of the inventions described herein, it is by no means the only device architecture on which at least a portion of the features and techniques described herein may be implemented. For example, architectures having one or any number of processors 13 may be used, and such processors 13 may be present in a single device or distributed among any number of devices. In one embodiment, a single processor 13 handles communications as well as routing computations, while in other embodiments a separate dedicated communications processor may be provided. In various embodiments, different types of features or functionalities may be implemented in a system according to the invention that includes a client device (such as a tablet device or smartphone running client software) and server systems (such as a server system described in more detail below).

Regardless of network device configuration, the system of the present invention may employ one or more memories or memory modules (such as, for example, remote memory block 16 and local memory 11) configured to store data, program instructions for the general-purpose network operations, or other information relating to the functionality of the embodiments described herein (or any combinations of the above). Program instructions may control execution of or comprise an operating system and/or one or more applications, for example. Memory 16 or memories 11, 16 may also be configured to store data structures, configuration data, encryption data, historical system operations information, or any other specific or generic non-program information described herein.

Because such information and program instructions may be employed to implement one or more systems or methods described herein, at least some network device embodiments may include nontransitory machine-readable storage media, which, for example, may be configured or designed to store program instructions, state information, and the like for performing various operations described herein. Examples of such nontransitory machine-readable storage media include, but are not limited to, magnetic media such as hard disks, floppy disks, and magnetic tape; optical media such as CD-ROM disks; magneto-optical media such as optical disks, and hardware devices that are specially configured to store and perform program instructions, such as read-only memory devices (ROM), flash memory (as is common in mobile devices and integrated systems), solid state drives (SSD) and "hybrid SSD" storage drives that may combine physical components of solid state and hard disk drives in a single hardware device (as are becoming increasingly common in the art with regard to personal computers), memristor memory, random access memory (RAM), and the like. It should be appreciated that such storage means may be integral and non-removable (such as RAM hardware modules that may be soldered onto a motherboard or otherwise integrated into an electronic device), or they may be removable such as swappable flash memory modules (such as "thumb drives" or other removable media designed for rapidly exchanging physical storage devices), "hot-swappable" hard disk drives or solid state drives, removable optical storage discs, or other such removable media, and that such integral and removable storage media may be utilized interchangeably. Examples of program instructions include both object code, such as may be produced by a compiler, machine code, such as may be produced by an assembler or a linker, byte code, such as may be generated by for example a JAVA™ compiler and may be executed using a Java virtual machine or equivalent, or files containing higher level code that may be executed by the computer using an interpreter (for example, scripts written in Python, Perl, Ruby, Groovy, or any other scripting language).

Figure 2:
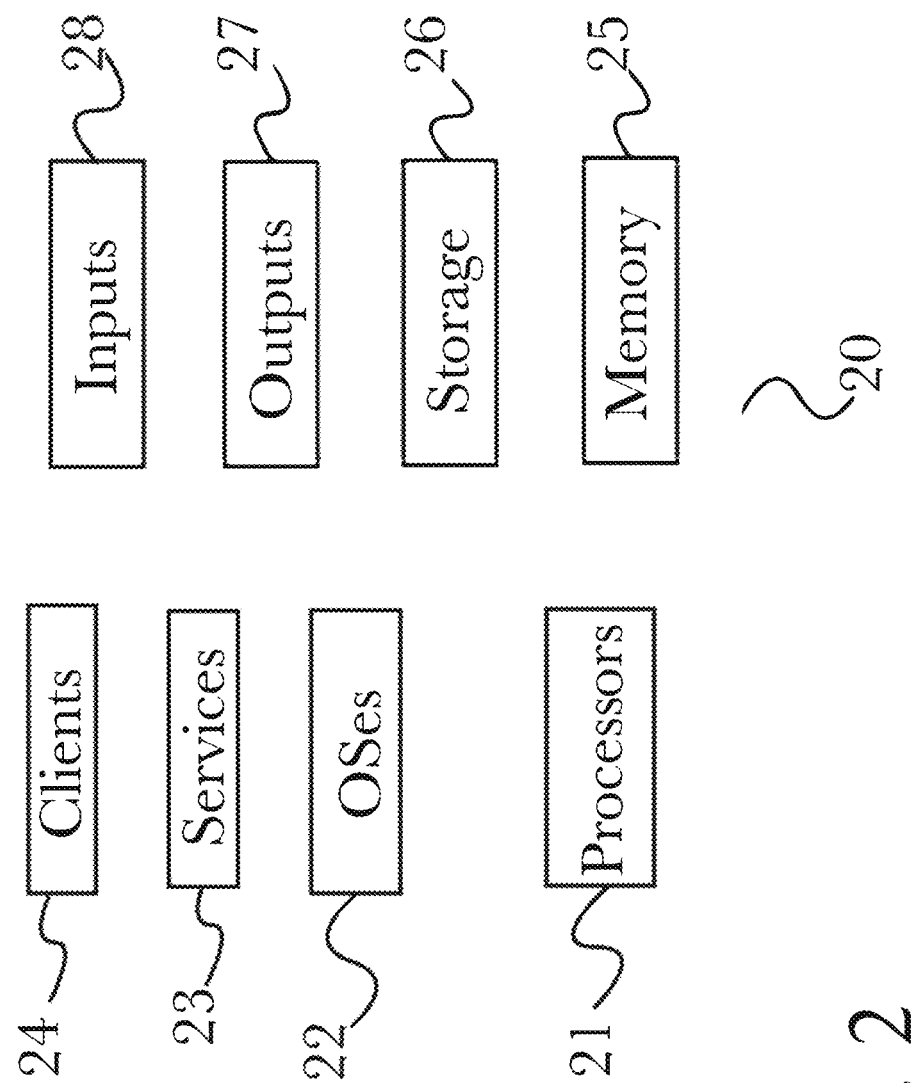
FIG. 2 is a block diagram illustrating an exemplary logical architecture for a client device, according to various embodiments of the invention.

In some embodiments, systems according to the present invention may be implemented on a standalone computing system. Referring now to FIG. 2, there is shown a block diagram depicting a typical exemplary architecture of one or more embodiments or components thereof on a standalone computing system. Computing device 20 includes processors 21 that may run software that carry out one or more functions or applications of embodiments of the invention, such as for example a client application 24. Processors 21 may carry out computing instructions under control of an operating system 22 such as, for example, a version of Microsoft's WINDOWS™ operating system, Apple's Mac OS/X or iOS operating systems, some variety of the Linux operating system, Google's ANDROID™ operating system, or the like. In many cases, one or more shared services 23 may be operable in system 20, and may be useful for providing common services to client applications 24. Services 23 may for example be WINDOWS™ services, userspace common services in a Linux environment, or any other type of common service architecture used with operating system 21. Input devices 28 may be of any type suitable for receiving user input, including for example a keyboard, touchscreen, microphone (for example, for voice input), mouse, touchpad, trackball, or any combination thereof.

Output devices 27 may be of any type suitable for providing output to one or more users, whether remote or local to system 20, and may include for example one or more screens for visual output, speakers, printers, or any combination thereof. Memory 25 may be random-access memory having any structure and architecture known in the art, for use by processors 21, for example to run software. Storage devices 26 may be any magnetic, optical, mechanical, memristor, or electrical storage device for storage of data in digital form (such as those described above). Examples of storage devices 26 include flash memory, magnetic hard drive, CD-ROM, and/or the like.

Figure 3:
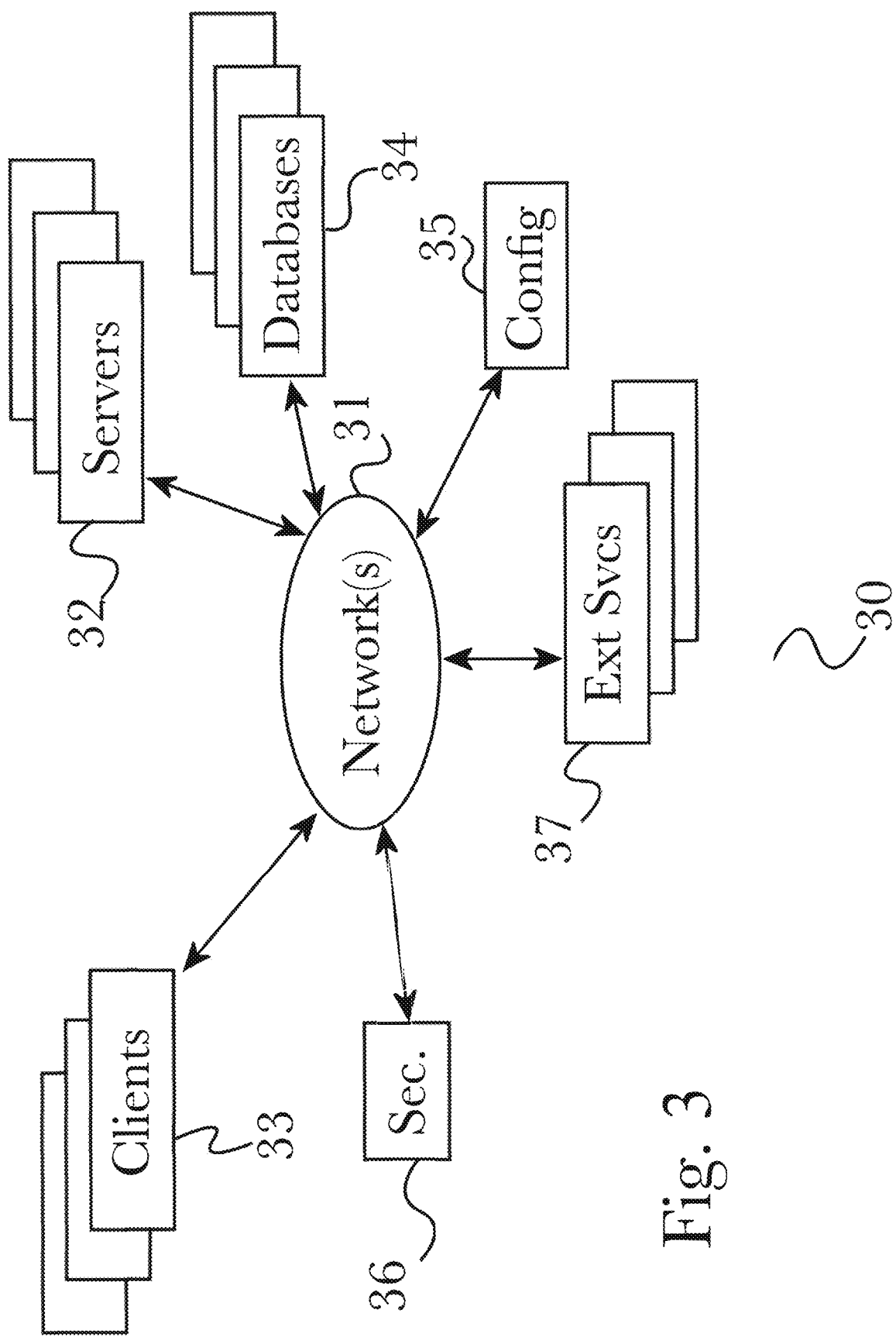
FIG. 3 is a block diagram illustrating an exemplary architectural arrangement of clients, servers, and external services, according to various embodiments of the invention.

In some embodiments, systems of the present invention may be implemented on a distributed computing network, such as one having any number of clients and/or servers. Referring now to FIG. 3, there is shown a block diagram depicting an exemplary architecture 30 for implementing at least a portion of a system according to an embodiment of the invention on a distributed computing network. According to the embodiment, any number of clients 33 may be provided. Each client 33 may run software for implementing client-side portions of the present invention; clients may comprise a system 20 such as that illustrated above. In addition, any number of servers 32 may be provided for handling requests received from one or more clients 33. Clients 33 and servers 32 may communicate with one another via one or more electronic networks 31, which may be in various embodiments any of the Internet, a wide area network, a mobile telephony network (such as CDMA or GSM cellular networks), a wireless network (such as WiFi, Wimax, LTE, and so forth), or a local area network (or indeed any network topology known in the art; the invention does not prefer any one network topology over any other). Networks 31 may be implemented using any known network protocols, including for example wired and/or wireless protocols.

In addition, in some embodiments, servers 32 may call external services 37 when needed to obtain additional information, or to refer to additional data concerning a particular call. Communications with external services 37 may take place, for example, via one or more networks 31. In various embodiments, external services 37 may comprise web-enabled services or functionality related to or installed on the hardware device itself. For example, in an embodiment where client applications 24 are implemented on a smartphone or other electronic device, client applications 24 may obtain information stored in a server system 32 in the cloud or on an external service 37 deployed on one or more of a particular enterprise's or user's premises.

In some embodiments of the invention, clients 33 or servers 32 (or both) may make use of one or more specialized services or appliances that may be deployed locally or remotely across one or more networks 31. For example, one or more databases 34 may be used or referred to by one or more embodiments of the invention. It should be understood by one having ordinary skill in the art that databases 34 may be arranged in a wide variety of architectures and using a wide variety of data access and manipulation means. For example, in various embodiments one or more databases 34 may comprise a relational database system using a structured query language (SQL), while others may comprise an alternative data storage technology such as those referred to in the art as "NoSQL" (for example, Hadoop Cassandra, Google BigTable, and so forth). In some embodiments, variant database architectures such as column-oriented databases, in-memory databases, clustered databases, distributed databases, or even flat file data repositories may be used according to the invention. It will be appreciated by one having ordinary skill in the art that any combination of known or future database technologies may be used as appropriate, unless a specific database technology or a specific arrangement of components is specified for a particular embodiment herein. Moreover, it should be appreciated that the term "database" as used herein may refer to a physical database machine, a cluster of machines acting as a single database system, or a logical database within an overall database management system. Unless a specific meaning is specified for a given use of the term "database", it should be construed to mean any of these senses of the word, all of which are understood as a plain meaning of the term "database" by those having ordinary skill in the art.

Similarly, most embodiments of the invention may make use of one or more security systems 36 and configuration systems 35. Security and configuration management are common information technology (IT) and web functions, and some amount of each are generally associated with any IT or web systems. It should be understood by one having ordinary skill in the art that any configuration or security subsystems known in the art now or in the future may be used in conjunction with embodiments of the invention without limitation, unless a specific security 36 or configuration system 35 or approach is specifically required by the description of any specific embodiment.

Figure 4:
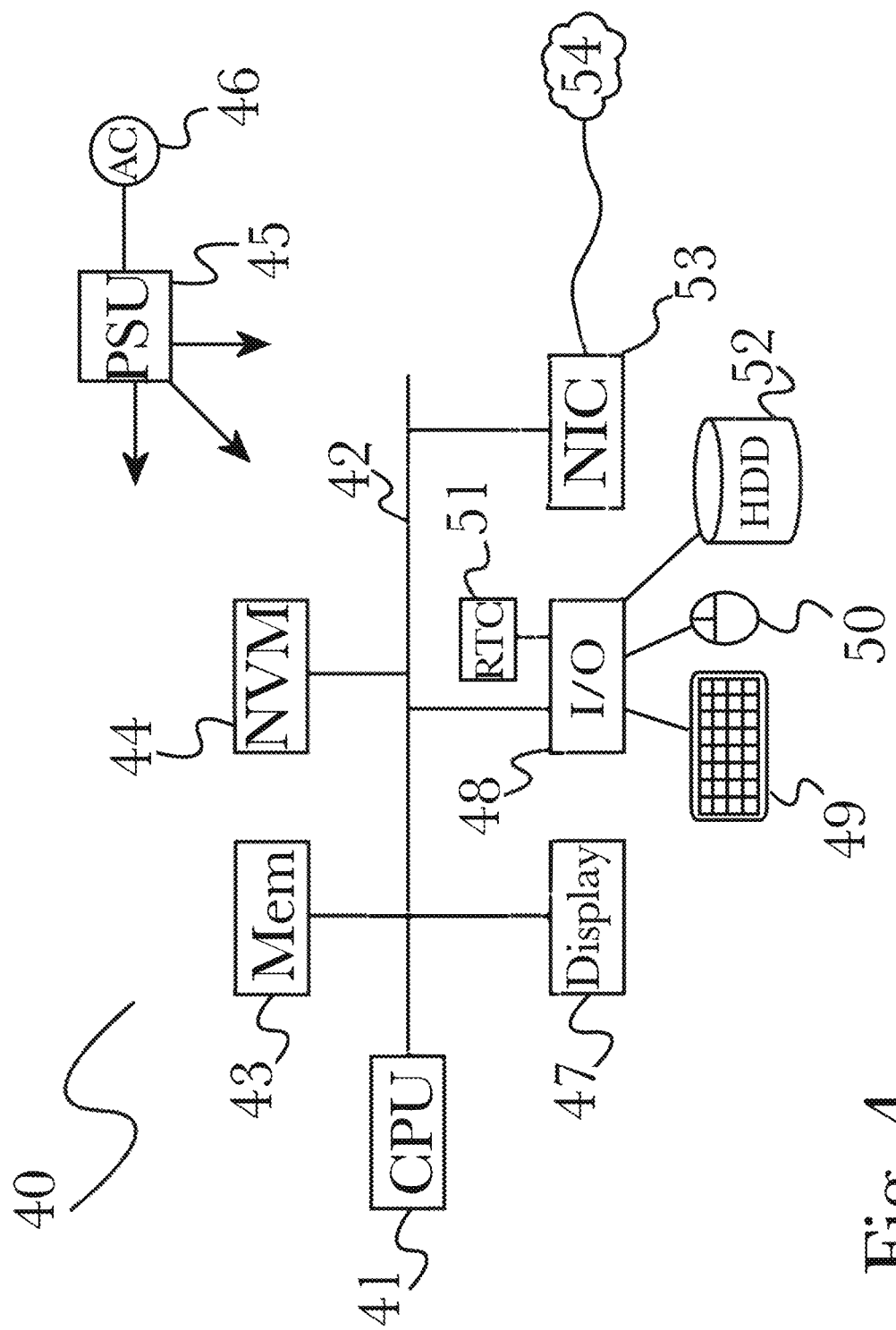
FIG. 4 is a block diagram illustrating an exemplary overview of a computer system as may be used in any of the various locations throughout the system

FIG. 4 shows an exemplary overview of a computer system 40 as may be used in any of the various locations throughout the system. It is exemplary of any computer that may execute code to process data. Various modifications and changes may be made to computer system 40 without departing from the broader scope of the system and method disclosed herein. Central processor unit (CPU) 41 is connected to bus 42, to which bus is also connected memory 43, nonvolatile memory 44, display 47, input/output (I/O) unit 48, and network interface card (NIC) 53. I/O unit 48 may, typically, be connected to keyboard 49, pointing device 50, hard disk 52, and real-time clock 51. NIC 53 connects to network 54, which may be the Internet or a local network, which local network may or may not have connections to the Internet. Also shown as part of system 40 is power supply unit 45 connected, in this example, to a main alternating current (AC) supply 46. Not shown are batteries that could be present, and many other devices and modifications that are well known but are not applicable to the specific novel functions of the current system and method disclosed herein. It should be appreciated that some or all components illustrated may be combined, such as in various integrated applications, for example Qualcomm or Samsung system-on-a-chip (SOC) devices, or whenever it may be appropriate to combine multiple capabilities or functions into a single hardware device (for instance, in mobile devices such as smartphones, video game consoles, in-vehicle computer systems such as navigation or multimedia systems in automobiles, or other integrated hardware devices).

In various embodiments, functionality for implementing systems or methods of the present invention may be distributed among any number of client and/or server components. For example, various software modules may be implemented for performing various functions in connection with the present invention, and such modules may be variously implemented to run on server and/or client components.

Conceptual Architecture

Figure 5:
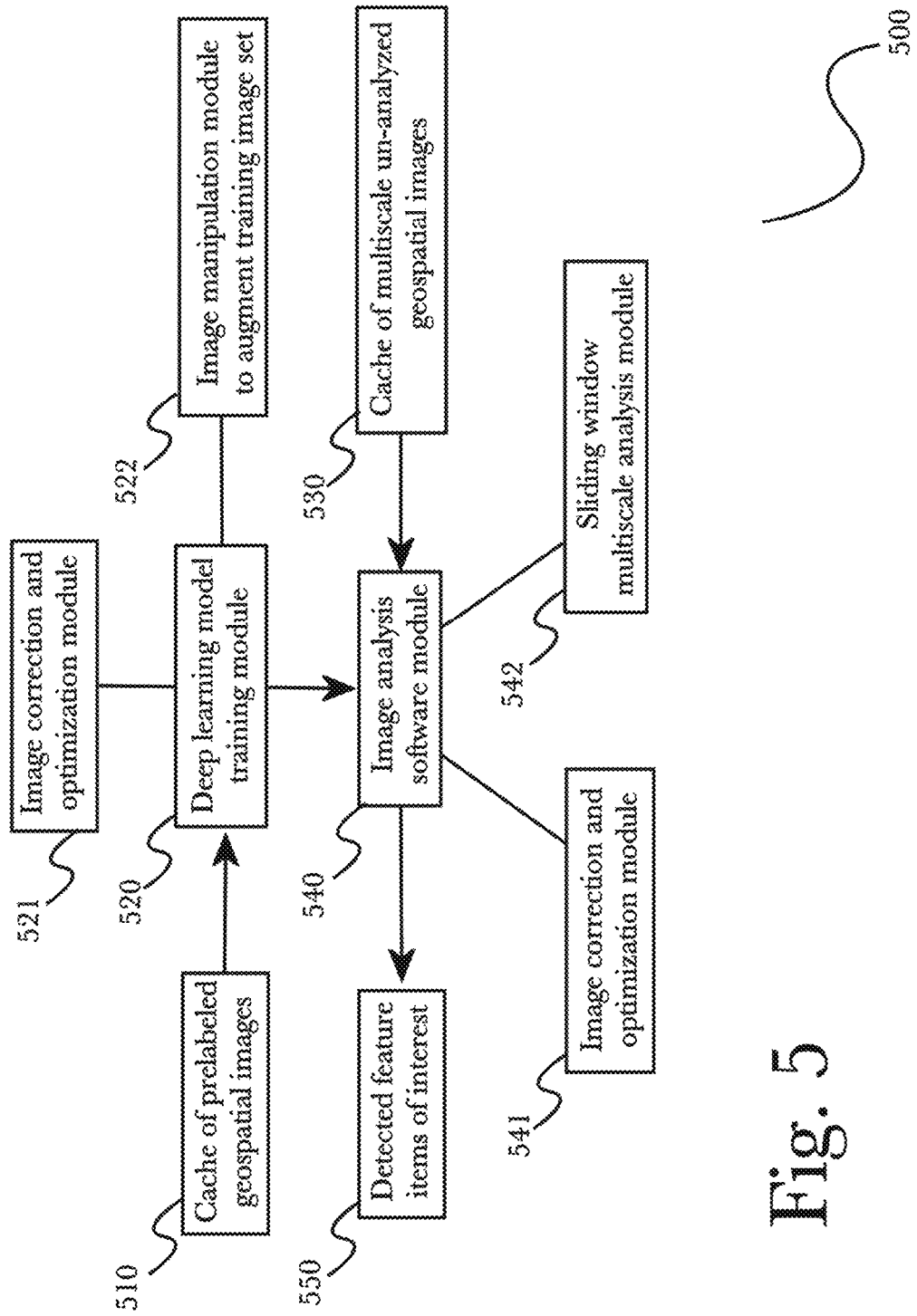
FIG. 5 is a diagram of an exemplary architecture for a system for automated image analysis that uses the deep learning model and a convolutional neural network, according to a preferred embodiment of the invention.

FIG. 5 is a block diagram of an exemplary architecture for a system 500 for automated image analysis that uses the deep learning model and a convolutional neural network, according to a preferred embodiment of the invention.

According to the embodiment, a cache of pre-labeled, orthorectified geospatial image segments 510 is employed by deep learning training module 520 for the purpose of training the system 500 to identify feature items of interest to those running the analysis. This cache of pre-labeled geospatial image segments 510 could be stored within a directory or part of a database of geospatial image segments stored on a disk system within the computer running the deep learning model training module 520, stored in a directory, or in a database on a disk system directly connected to the computer running the deep learning model training module 520 by an external bus such as the universal serial bus or eSATA. Image cache might also be stored on one or more computers other than that running the deep learning model module and connected to the deep learning module by a local internal network, the internet or by any other means known to the art as the system does not rely on any one method of image delivery whether server—client or peer to peer in nature. The system is also not restricted to specific mechanisms by which feature items of interest found in orthorectified geospatial image segments to be used in training of the system are identified and labeled prior to use in training. One preferred embodiment might use cache 510 where feature items of interest are labeled prior to training by many participants in a crowdsourcing campaign to tag one or more feature items in each image segment found within the cache. Image segments tagged in this way where tagging accuracy of items is known to be high could then be added to the training cache for that feature item category (building, airliner, storage tank, truck). Another preferred embodiment might use cache of geospatial images 510 where feature items of interest are labeled by trained image analysts, either specifically for use in the deep learning model training module or as part of other analyses and then re-purposed later for deep learning model training module 520. Caches of pre-labeled geospatial images used to train the system 500 could contain mixtures of image segments obtained crowdsourcing, image analyst generated effort, as well as image segments where specific feature items are identified and pre-labeled by any other method known to those skilled in the art, as the invention does not rely on any specific mode of identification and labeling for deep level training model module operation.

Prior to use in the training of the image analysis software module 540 image segments from the cache of pre-labeled geospatial image segments 510 undergo one or more steps of digital image correction and optimization 521. A digital correction that might be done to image segments to be used by deep learning model training module is conversion from color to grayscale as this correction reduces image segment complexity, which aids in the training process. In a preferred embodiment of the system the conversion is done by first converting the image from the RGB colorspace to the YCrCb colorspace and then discarding all but Y channel data which results in a grayscale image of tonal quality known to work well in deep learning model training of convolutional neural net used in the invention. The method of color to grayscale image conversion outlined here is meant only to be exemplary and should not be seen to limit conversion method that could be used, including the absence of this color to grayscale conversion in the training image preparation process. Another type of image correction that may be employed to prepare pre-labeled geospatial images for use in training is histogram normalization which often increases image contrast and serves to reduce the effects of exposure by producing sets of image segments with similar dynamic range profiles prior to use in training of the image analysis module 540. Examples of histogram normalization filters that may be used to prepare geospatial images for training are linear histogram normalization, histogram equalization, adaptive histogram equalization, and contrast limiting adaptive histogram equalization. One skilled in the art will realize that while the use of these image histogram manipulation methods may produce image segments significantly better suited for the supervised stage of deep learning 520, the system described herein does not absolutely rely on histogram normalization in its generalized form or and of the exemplary histogram manipulation methods specifically. In addition to or in lieu of to those mentioned in some depth, image filters such as Gaussian, median filter, and bilateral filter to enhance edge contrast may be applied to pre-labeled geospatial image segments as is common in the art, however the listing of these filters is meant only to provide examples and should not be taken to bar the use of other filters that are not listed as part of the invention.

As is appreciated by those skilled in the art, much of the recent success in the recognition of specific objects in digital images by computers using trained convolutional neural networks is due to the use of the deep learning method. Under this method of training, the convolutional neural network is first trained with a set of images where the item to be identified, ideally in conjunction with a large plurality of backgrounds and in a large plurality of orientations, is clearly demarcated digitally. This stage of deep learning is referred to by the art as "supervised." The number of images where the object of interest has been clearly demarcated is often limited and often gives rise to trained convolutional neural networks that are excellent in recognizing the object of interest in the training set but otherwise recognize the object of interest poorly. Object recognition reliability is significantly increased by exposure of the convolutional neural network to sets of images, much larger in image number than the labeled-training set, where the object of interest is present but not labeled or where the object may not be present. This stage of learning is referred to by the art as "unsupervised." One method to generate large sets of images for unsupervised learning is to screen very large repositories of general images for suitable examples. Another method of generating the unsupervised learning image set is to start with the set of images used for supervised learning stage and modify them by linearly translating or rotationally transforming the object of interest; changing the appearance of the object of interest or background through image histogram modification, Gaussian filter, bilateral filter or median blur filter; or both using object placement and filter modification to create a plurality of images useful in the unsupervised learning stage from each image used in the supervised learning stage. In one preferred embodiment of the system 500 it is this second method, manipulating the geospatial images used in the supervised learning stage to augment the training image set, which is depicted 522. The choice to depict this one method was for figure simplification only as system training by deep learning method training module can use geospatial images generated by either method, identification of new images, or manipulation of the supervised learning image set, even some mixture of both methods, to train image analysis software module 540.

The trained image analysis software module 540 can and often does have the ability to identify multiple categories of objects of interest from geospatial imagery. For example a first image analysis software module may identify items from a set comprising buildings, tents, cars, airliners, oil refineries, and soccer fields from geospatial images. Other image analysis software modules may have identification repertoires that differ partially or completely from the first image analysis software module as the invention. Physically, the image analysis software module can be present on the same computer as the deep learning model training module 520, or could be placed anywhere in the world, as once training is complete, no connection between the server running the deep learning module training module 520 and the image analysis software module 540 is necessary. The trained convolutional neural network can even be programmatically cloned such that a plurality of instances of image analysis software modules 540 with the same object identification repertoire may be present concurrently with no specific geographical relationship, the only stipulation being that there is access to a cache of orthorectified, multi-scale, geospatial image segments tagged with information that allows the geographical location of image capture and the scaling factor to be determined 530. In a preferred embodiment of the system, image correction filters 541 taken from a set that comprises histogram normalization, edge enhancement and cloud detection. A cloud detection filters is present to allow removal of images when occlusion prevents analysis of the ground below. These filters 541 are depicted as applied on the same computer on which the image analysis software module resides but filters can be applied on any remote computer that is logically between the cache of multi-scale unanalyzed geospatial image segments 530 and the image analysis software module 540. During image analysis, geospatial image segments of the same region but differing scale factors are scanned by sliding window multi-scale analysis module 542 which converts between any internal coordinate system used by the cache of geospatial images in use to geographical latitude and longitude while tracking all changes in fine positioning coordinates as the window of focus changes. While each image segment is scanned, all features of interest that are identified are given a confidence factor number reflecting correspondence between the newly detected item and the image analysis software module's set of characteristics for the item. Feature items of interest detected by the image analysis software module 540 during the scan of geospatial image segments from cache 530 are then reported by the system 550 in a format specified by the requester. As examples, reports may be in the form of appropriately scaled geospatial images tagged with either tokens or color shading which represent each feature item of interest, or may be rows of text providing such information as item type, latitude and longitude, but may take any format dictated by the needs of the analysis and known to the art.

Figure 10:
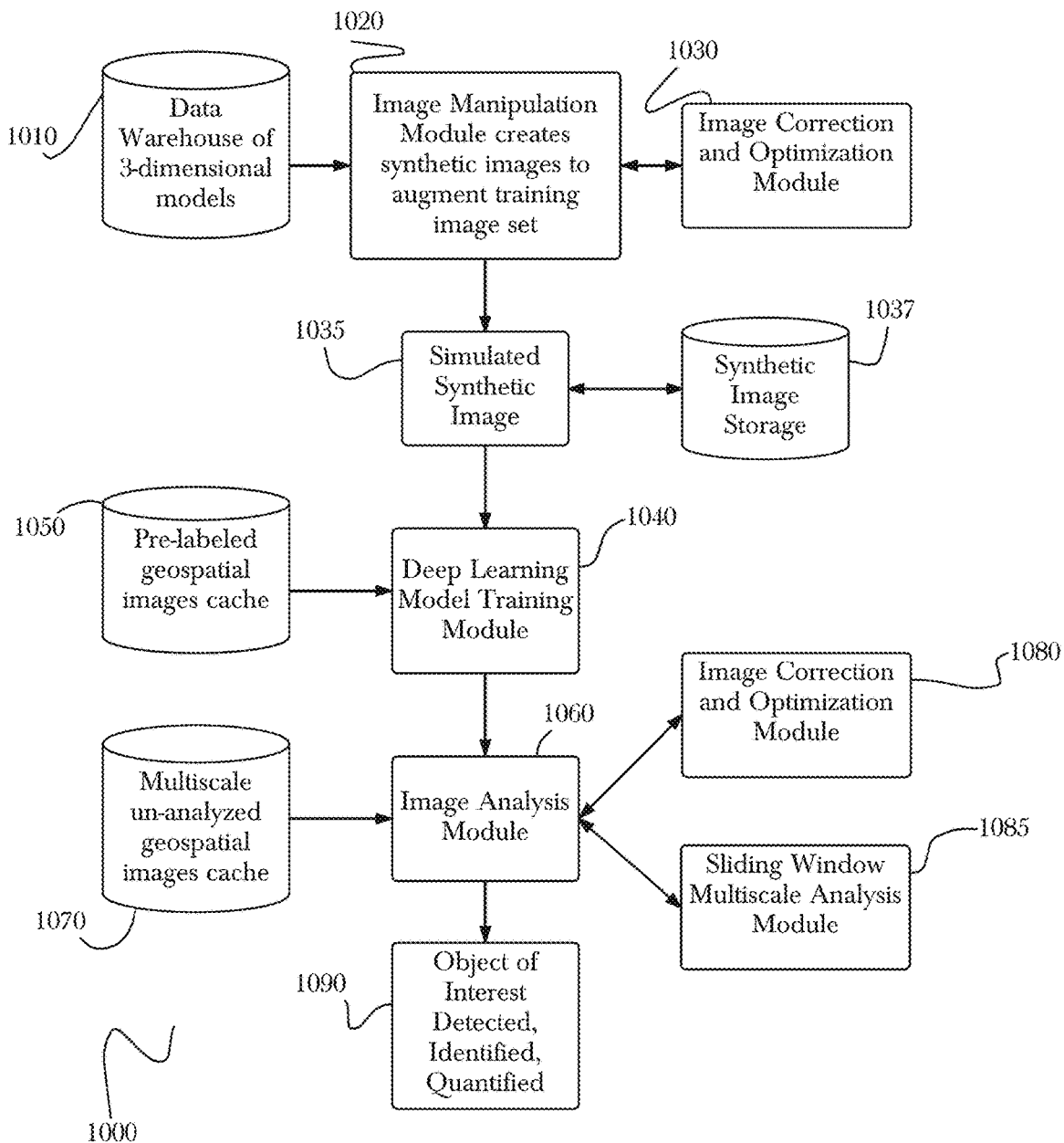
FIG. 10 is a diagram depicting an exemplary architecture for a system for automated image analysis that uses synthetic training data in an image manipulation module, a deep learning module and an image analysis module, according to a preferred embodiment of the invention.

FIG. 10 is a block diagram of an exemplary architecture for a system 1000 for automated image analysis that uses an image manipulation software module along with a deep learning model and a convolutional neural network, according to a preferred embodiment of the invention. According to the embodiment, a database 1010 of 3-dimensional models is tapped to provide simulated models which are manipulated by the image manipulation software 1020 to create synthetic training images 1035 for use by the deep learning model training module 1040 in addition to a cache of pre-labeled, orthorectified geospatial image segments 1050 for the purpose of training the system 1000 to identify feature objects of interest. The simulated synthetic images 1035 created by the image manipulation software module 1020 may be stored within the deep learning training module 1040 or within a separate collection point 1037. Both the cache of pre-labeled geospatial image segments 1050 and or the simulated synthetic images 1037 may be stored within a directory or within a database of geospatial image segments stored on a disk system within the computer running the deep learning model training module 1040, stored in a directory, or in a database on a disk system directly connected to the computer running the deep learning model training module 1040 by an external bus such as the universal serial bus, eSATA, or the like. Image caches 1050, 1037 might also be stored on one or more computers other than that running the deep learning model module 1040 and connected to the deep learning module by a local internal network, the internet or by any other means known to the art as the system does not rely on any one method of image delivery whether server—client or peer to peer in nature. The system is also not restricted to specific mechanisms by which feature objects of interest found in orthorectified geospatial image segments, whether real or synthetic, to be used in training of the system are identified and labeled prior to use in training. One preferred embodiment might use simulated synthetic images 1035, created and labeled by the image manipulation software module 1020 to augment or replace images available from cache 1050, as significant effort is required to identify and label existing images or not enough existing images are available to conduct training. In another preferred embodiment of the invention, cache 1050 may label feature objects of interest prior to training by many participants in a crowdsourcing campaign to tag one or more feature items in each image segment found within the cache. Another preferred embodiment might use cache of geospatial images 1050 where feature items of interest are labeled by trained image analysts, either specifically for use in the deep learning model training module 1040 or as part of other analyses and then re-purposed later for deep learning model training module 1040. Yet another preferred embodiment may use only synthetic images created from image manipulation software 1020 in cases where the item of interest is rare in existence or to bypass the manual work required to generate the cache 1050 associated with the specific object of interest. Caches of pre-labeled geospatial images used to train the system 1000 may contain mixtures of image segments obtained from image manipulation 1020, crowdsourcing, image analyst generated effort, as well as image segments where specific feature items are identified and pre-labeled by any other method known to those skilled in the art, as the invention does not rely on any specific mode of identification and labeling for deep level training model module operation.

Prior to use in the training of the image analysis software module 1050, image segments created by image manipulation software 1020 may undergo one or more steps of digital image correction and optimization 1030. For example, a digital correction that may be done to synthetic image segments to be used by deep learning model training module is conversion from CAD renderings to color to enhance realism in the modeled image or and color to grayscale as this correction reduces image segment complexity, both of which aid in the training process. In a preferred embodiment of the system 1000 the color to grayscale conversion may be done by first converting the image from the RGB colorspace to the YCrCb colorspace and then discarding all but Y channel data which results in a grayscale image of tonal quality known to work well in deep learning model training of convolutional neural net used in the invention. The method of color to grayscale image conversion outlined here is meant only to be exemplary and should not be seen to limit conversion method that could be used, including the absence of this color to grayscale conversion in the training image preparation process. In another embodiment, image correction that may be employed to prepare synthetic images for use in training may be histogram normalization which may often increases image contrast and may serve to reduce the effects of exposure by producing sets of image segments with similar dynamic range profiles prior to use in training of the image analysis module 1060. Examples of histogram normalization filters that may be used to prepare geospatial images for training are linear histogram normalization, histogram equalization, adaptive histogram equalization, and contrast limiting adaptive histogram equalization. One skilled in the art will realize that while the use of these image histogram manipulation methods may produce image segments significantly better suited for the supervised stage of deep learning 1040, the system described herein does not absolutely rely on histogram normalization in its generalized form or and of the exemplary histogram manipulation methods specifically. In addition to or in lieu of to those mentioned in some depth, image filters such as Gaussian, median filter, and bilateral filter to enhance edge contrast may be applied to synthetic image segments as is common in the art, however the listing of these filters is meant only to provide examples and should not be taken to bar the use of other filters that are not listed as part of the invention.

As is appreciated by those skilled in the art, much of the recent success in the recognition of specific objects in digital images by computers using trained convolutional neural networks is due to the use of the deep learning method. Under this method of training, the convolutional neural network is first trained with a set of images where the item to be identified, ideally in conjunction with a large plurality of backgrounds and in a large plurality of orientations, is clearly demarcated digitally. This stage of deep learning is referred to by the art as "supervised." By using the synthetic training images 1035, the number of real images where the object of interest has been clearly demarcated is no longer a limiting factor which affects performance classification reliability and success, and therefore gives rise to trained convolutional neural networks that are excellent in recognizing the object of interest in the training by utilizing synthetic images in lieu of or partially in lieu of real training images. Object recognition reliability is further increased by exposure of the convolutional neural network to sets of images, much larger in image number than the labeled-training set, where the object of interest is present but not labeled or where the object may not be present. This stage of learning is referred to by the art as "unsupervised." One method to generate large sets of images for unsupervised learning is to screen very large repositories 1070 of general images for suitable examples. Another method of generating the unsupervised learning image set is to start with the set of images 1037 or and 1050 used for supervised learning stage, be they real or synthetic or a mixture of both, and modify them by linearly translating or rotationally transforming the object of interest; changing the appearance of the object of interest or background through image histogram modification, Gaussian filter, bilateral filter or median blur filter; or both using object placement and filter modification to create a plurality of images useful in the unsupervised learning stage from each image used in the supervised learning stage. The choice to depict this one method is for figure simplification only as system training by deep learning method training module 1040 may use geospatial images generated by either method, identification of new images, or manipulation of the supervised learning image set, even some mixture of both methods, to train image analysis software module 1060.

The trained image analysis software module 1060 may have the ability to identify multiple categories of objects of interest from geospatial imagery. For example a first image analysis software module may identify items from a set comprising, for example, buildings, tents, cars, airliners, oil refineries, and soccer fields from real and/or synthetic geospatial images. Other image analysis software modules may have identification repertoires that differ partially or completely from the first image analysis software module as the invention. In some embodiments, image analysis software module 1060 may be part of the same device as deep learning model training module 1040. In other embodiment, image analysis software module 1060 and deep learning model training module 1040 may be separate devices connected by network 9876. Once training is complete, a connection between deep learning module training module 1040 and image analysis software module 1060 is not necessary. In some embodiment, the trained convolutional neural network may operate as a plurality of instances of image analysis software modules 1060 with the same object identification repertoire being present concurrently with no specific geographical relationship, provided that there is access to a cache of orthorectified, multi-scale, geospatial image segments tagged with information that allows the geographical location of image capture and the scaling factor to be determined 1070. In a preferred embodiment of the system, image correction filters 1080 taken from a set that comprises histogram normalization, edge enhancement and cloud detection. A cloud detection filters is present to allow removal of images when occlusion prevents analysis of, for example, the ground below. These filters 1080 are depicted as applied on the same computer on which the image analysis software module 1060 resides but filters can be applied on any remote computer that is logically between the cache of multi-scale unanalyzed geospatial image segments 1070 and the image analysis software module 1060. During image analysis, geospatial image segments of the same region but differing scale factors are scanned by sliding window multi-scale analysis module 1085 which converts between any internal coordinate system used by the cache of geospatial images in use to geographical latitude and longitude while tracking all changes in fine positioning coordinates as the window of focus changes. While each image segment is scanned, all features of interest that are identified are given a confidence factor number reflecting correspondence between the newly detected item and image analysis software module's set of characteristics for the item. Feature items of interest detected by the image analysis software module 1060 during the scan of geospatial image segments from cache 1070 are then reported by system 1090 in a format specified by the requester. As examples, reports may be in the form of appropriately scaled geospatial images tagged with either tokens or color shading which represent each feature item of interest, or may be rows of text providing such information as item type, latitude and longitude, but may take any format dictated by the needs of the analysis and known to the art.

Description of Method Embodiments

Figure 6:
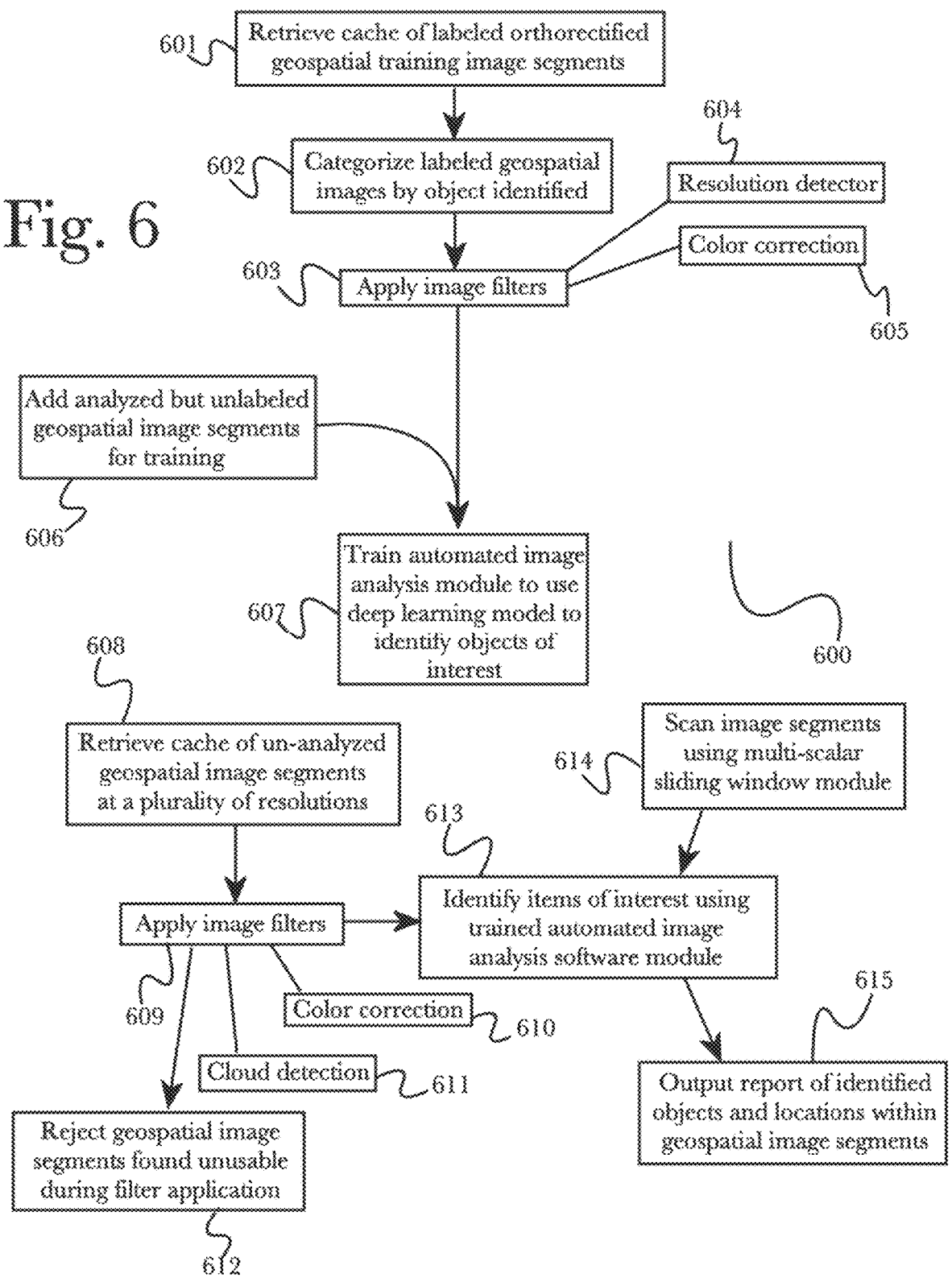
FIG. 6 is a process flow diagram of a method for geospatial image analysis that uses the deep learning model and a convolutional neural network using a system of the invention.

FIG. 6 is a process flow diagram of a method 600 for geospatial image analysis that uses the deep learning model and a convolutional neural network using a system of the invention. According to the embodiment, orthorectified geospatial image segments that have been previously analyzed and where feature items of a specific type which may include, but are not limited to trucks, fighter aircraft, oil wells, missile launchers or elephants have been clearly demarcated and labeled are retrieved from a cache of images

601. The mechanism that results in the labeling of specific objects within geospatial image segments available from the cache 601 whether that mechanism be analysis and labeling by trained image analysts, intended for use in the method 600 or for some other purpose but then re-purposed for the method 600; those segments are labeled by a crowdsourcing where a plurality participants, paid or volunteer, analyze the same image segments from a set of image segments in campaign to identify and precisely demarcate the same feature item and then image segments where the labeling accuracy is calculated to be statistically very high are placed in the cache 601; or labeled by some means not listed; should not be seen to limit method 600 as the method is envisioned to utilize all of those mechanisms either separately or together. As feature item types that might be of interest to the requester of geospatial image analysis often can be further divided into multiple subtypes, the feature items are frequently, though not always, placed into categories 602 prior to training of image analysis software module 540. For example, a "truck" could be "dump truck", "delivery truck", "tanker truck" "tractor trailer truck" or "tow truck", to name just a few. All of these "trucks" appear different in geospatial images and for the method 600, "trucks" of the same subtype ("delivery truck") but with widely different paint schemes might vary sufficiently to require additional cues be added prior to system training 609. The method 600, therefore, accounts for the need that geospatial image segments may need to be categorized by the generalized form of object that is labeled 602. One with ordinary skill in the art will understand that all categories used by method 600 are arbitrary and the discrete level of categorization depends upon the specifications of the search. For instance, using the "truck" example, one could envision an embodiment of the method 600 where the requestor may want to identify only "tanker trucks", so there would be no "truck" category. In another embodiment of the method 600 the requestor may want to identify "trucks" in general and "dump trucks" as a separate group. Whether placed into categories 602 or not placed into categories, orthorectified geospatial image segments that have been labeled to identify feature items which will be used to train the image analysis software module 540 may be optimized for the training process through the application of digital image filters 603. The scale or resolution of images to be used in training will be determined from metadata included with the image segments 604. Adjustment of image segment scale 603 might then occur because training the image analysis software module 540 relies on image segments bearing instances of the target feature item of interest presenting that object within narrowly controlled size range. In embodiment of the method 600, color correction filters may also be applied to image segments to be used to train the image analysis software module 540. One modification commonly applied to images used in deep learning model training 607 of convolutional neural networks used in image analysis software module 540 is conversion of color images to grayscale images 605 which serves to simplify the image significantly and also greatly simplifies the application of subsequent filters that may be used to optimize image for training. Color images may be converted to grayscale by first converting the image from the RGB colorspace to the YCrCb colorspace and then discarding all but Y channel data which results in a grayscale image of tonal quality known to work well in deep learning model training of convolutional neural net used in the invention. Other methods of color to grayscale conversion that might be used are linear desaturation by averaging the R, G, and B intensities of each pixel into a single grayscale intensity value, and weighted conversion where the intensities of the R, G, and B are multiplied by different weighting values based upon a predetermined desired end result and those weighted values then averaged into on single grayscale intensity value. Methods of color to grayscale image conversion 605 outlined here are meant only to be exemplary and should not be interpreted to limit conversion methods that could be used, including the absence of color to grayscale conversion in the training image preparation process. Another type of image correction 605 that may be employed to prepare pre-labeled geospatial images for use in deep learning model training 607 is histogram normalization which often increases image contrast and serves to reduce the effects of differences in lighting during exposure by producing sets of image segments with similar dynamic range profiles prior to use in training of the image analysis module 540. Examples of histogram normalization filters that might be used to prepare geospatial images for training are linear histogram normalization, histogram equalization, adaptive histogram equalization, and contrast limiting adaptive histogram equalization. One skilled in the art will realize that while the use of these image histogram manipulation methods may produce image segments significantly better suited for the supervised stage of deep learning 607, the method 600 described herein does not absolutely rely on histogram normalization in its generalized form or of the exemplary histogram manipulation methods specifically. In addition to, or in lieu of, those methods mentioned in some depth, image filters such as Gaussian, median filter, and bilateral filter may be applied to enhance edge contrast of pre-labeled geospatial image segments as is common in the art, however the listing of these filters is meant only to provide further examples and should not be taken to bar the use of other filters that are not listed as part of the invention or to suggest that the method 600 relies on any of these filters.

As is appreciated by those skilled in the art, much of the recent success in the recognition of specific objects in digital images by computers using trained convolutional neural networks is due to the use of the deep learning method 607. Under this method of training, the convolutional neural network is first trained with a set of images where the item to be identified, ideally in collocation with a large plurality of backgrounds and in a large plurality of orientations, is clearly demarcated digitally. This stage of deep learning is referred to by the art as "supervised." The number of images where the object of interest has been clearly demarcated is often limited and often gives rise to trained convolutional neural networks that are excellent in recognizing the object of interest in the training set but otherwise recognize the object of interest poorly. Object recognition reliability is significantly increased by exposure of the convolutional neural network to sets of images 606, much larger in image number than the labeled-training set, where the object of interest is present but not labeled or where the object may not be present. This stage of learning is referred to by the art as "unsupervised." One approach to generate large sets of images 606 for unsupervised learning is to screen very large repositories of general images for suitable examples. Another approach of generating the unsupervised learning image set 606 is to start with the set of images used for supervised learning stage 601 and modify them by linearly translating or rotationally transforming the object of interest; changing the appearance of the object of interest or background through image histogram modification, Gaussian filter, bilateral filter or median blur filter 603; or both using object placement and filter modification to create a plurality of images 606 useful in the unsupervised learning stage from images 601 used in the supervised learning stage. The method 600 depicted here can use geospatial images generated by either approach, identification of new images, or manipulation of the supervised learning image set, even some mixture of both methods, in the deep learning model training 607 of the automated image analysis module 540.

Once trained, image analysis software module 540 can and often does have the ability to identify multiple categories of objects of interest 613 from caches of unanalyzed geospatial image segments 608. A first set may comprise buildings, tents, cars, airliners, oil refineries, and soccer fields. Another set may comprise zebra, elephants, tents, villages, light aircraft, and trucks. Items listed are merely a very short list of easily imagined examples, the model described herein allows the identification of any object that can be discerned from geospatial images by all means known to the art either with or without the use of digital image filters 609 which may be selected from a set comprising color to grayscale conversion, histogram correction or equalization, or contrast enhancement filters 610. Image segments may also be passed through cloud detection filter 611 which analyzes images for cloud cover that occludes a percentage of the image deemed to make the image unsuitable for further analysis and removes those images analysis 612. Model 600 can also allow for the automated identification and location determination of feature items of interest that vary greatly in size by using caches of unanalyzed source images that contain image segments of the same region stored at multiple scales. Sliding window software 614 that is part of 600 scans the images that are at different scales and precisely keeps track of the geographical coordinates by converting scaling factor and internal segment coordinate system information of the image segment cache into latitude and longitude. This, for instance, for the purpose of example only, a single automated image analysis module 540 might locate all of the cities and oil wells within the same region during a single analysis. By using caches of image segments taken of the same region over known intervals of time, the system might also be used to track migrations of animal herds, the movement of groups of people, or the movement of equipment, to name just a few of the many possible examples that one skilled in the art might envision, which are of significant interest but for which occupying the scarce and potentially costly talents of image analysts makes the study impractical. In all types of analysis, the system will generate some form of report 615. The format of the report, whether it be a set of geospatial images marked in some manner to show the locations of items of interest, numeric output showing some code for each item category plus latitude and longitude coordinates, item codes with internal geospatial image segment cache coordinates which might also include segments rejected due to image occlusion or any other format either physical or electronic which is known to the art and desired by the requestor of the survey as the system does not depend on one particular form of output.

Figure 7:
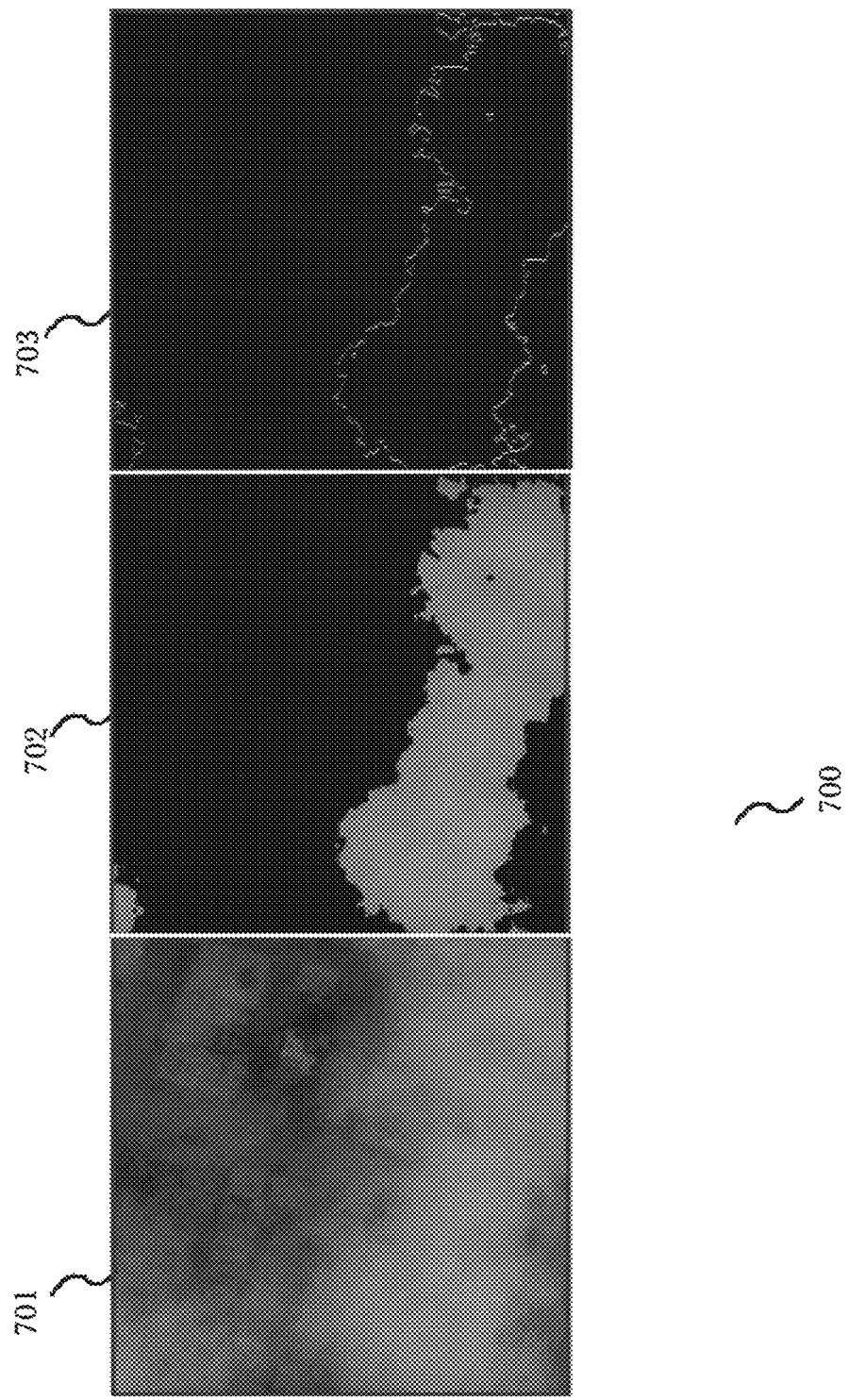
FIG. 7 is an example of image obstructing cloud detection by the image correction and optimization module, which is part of an automated system for geospatial image analysis of the invention.

FIG. 7 is a three-panel example 700 of cloud detection by image correction and optimization module 541 depicted in the exemplary system architecture block diagram of FIG. 5. When system 500 loads an image 701 from the cache of multi-scale unanalyzed geospatial image segments 530 for analysis, several image filters from a set including, but not limited to, color correction, artifact removal and resolution data determination may be applied. One such filter is specifically written to determine whether one or more portions of the field of view of the ground are occluded, for example by thick cloud cover. This software filter identifies subregions of the current working geospatial region that are obstructed by cloud cover using characteristics common to clouds in such images which include but are not limited to brightness, color uniformity and lack of image detail. After establishing the edges of cloud using one of the many edge detection methods known within the art, the filter changes all pixels constituent to the cloud to a single color value 702 to clearly demarcate the portion of the image that is obstructed. Further software within the image correction and optimization module 541 may then reject the image from image analysis for object identification 540 based upon a preselected threshold 703.

Figure 8:
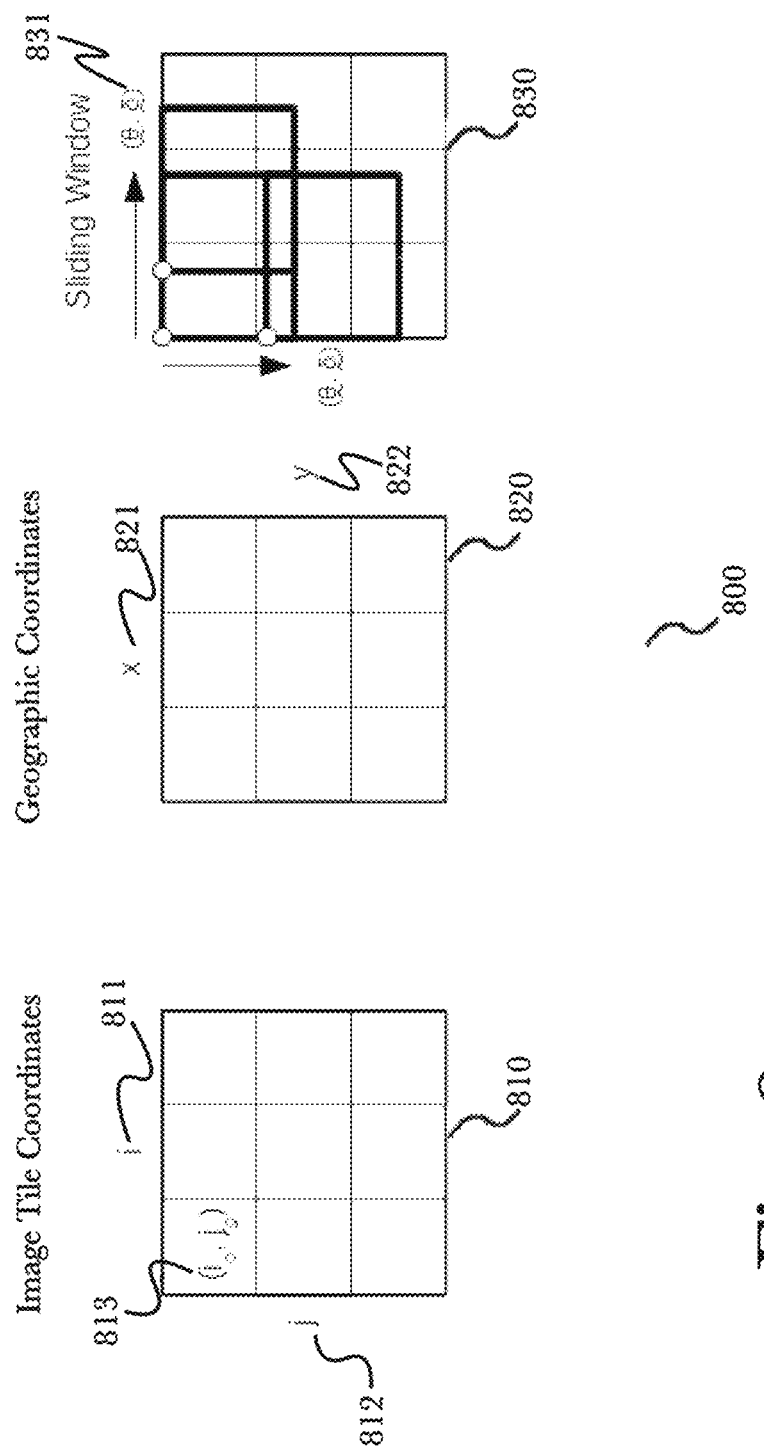
FIG. 8 is a diagram that illustrates the use of a sliding window module to translate the coordinate system used within the cache of geospatial images being analyzed and the geographical longitude and latitude system as part of the automated system for geospatial image analysis of the invention.

FIG. 8 is a three-panel diagram 800 depicting the operation of exemplary sliding window search and locate subroutines that are part of image analysis software module 540 of the invention depicted in FIG. 5. Establishment of the location of any identified objects of interest generally requires that conversion of the coordinate system used internal to the cache of multi-scale unanalyzed geospatial image segments 530 to the coordinates of earth latitude and longitude takes place. Cached orthorectified geospatial image segments, or tiles 810, are regularly stored in caches using cache-internal coordinate systems 811, 812 of which the tile map service system and the web map tile service are two standardized examples that the invention might encounter. It should be clear, however, that the mention of these two systems should not be construed as the only possible coordinate systems that method 600 might use, as the invention does not depend on any specific system and tiles encoded by any coordinate system known to those skilled in the art may be used, provided that that system supplies a conversion pathway to geographical latitude and longitude and also includes scaling information. In one embodiment of this design, the image cache service might provide internal row and column numbers of an image segment's origin 813 in addition to a scaling factor of the segment that is supplied. From this segment-specific information and any additional cache coordinate system specification information, sliding window subroutines of the invention can easily and accurately convert from the cache's coordinate system to standard geographical longitude 821 and latitude 822 for any point of the en-image segment that is undergoing analysis 820. Specifically this is done by subroutines in the sliding window software module which, as the window of focus scans a first image segment for objects of interest 830, keeps track of the change in latitude and longitude using the equation new=a sin(sin old×cos+cos old×sin×cos) for change in latitude and the equation new=old+a tan 2(sin× sin×cos old×cos−sin old×sin new) for longitude where is latitude, is longitude, is bearing (clockwise from north) and is angular distance traveled ((scale corrected distance traveled/radius of the earth)) 831.

Figure 9:
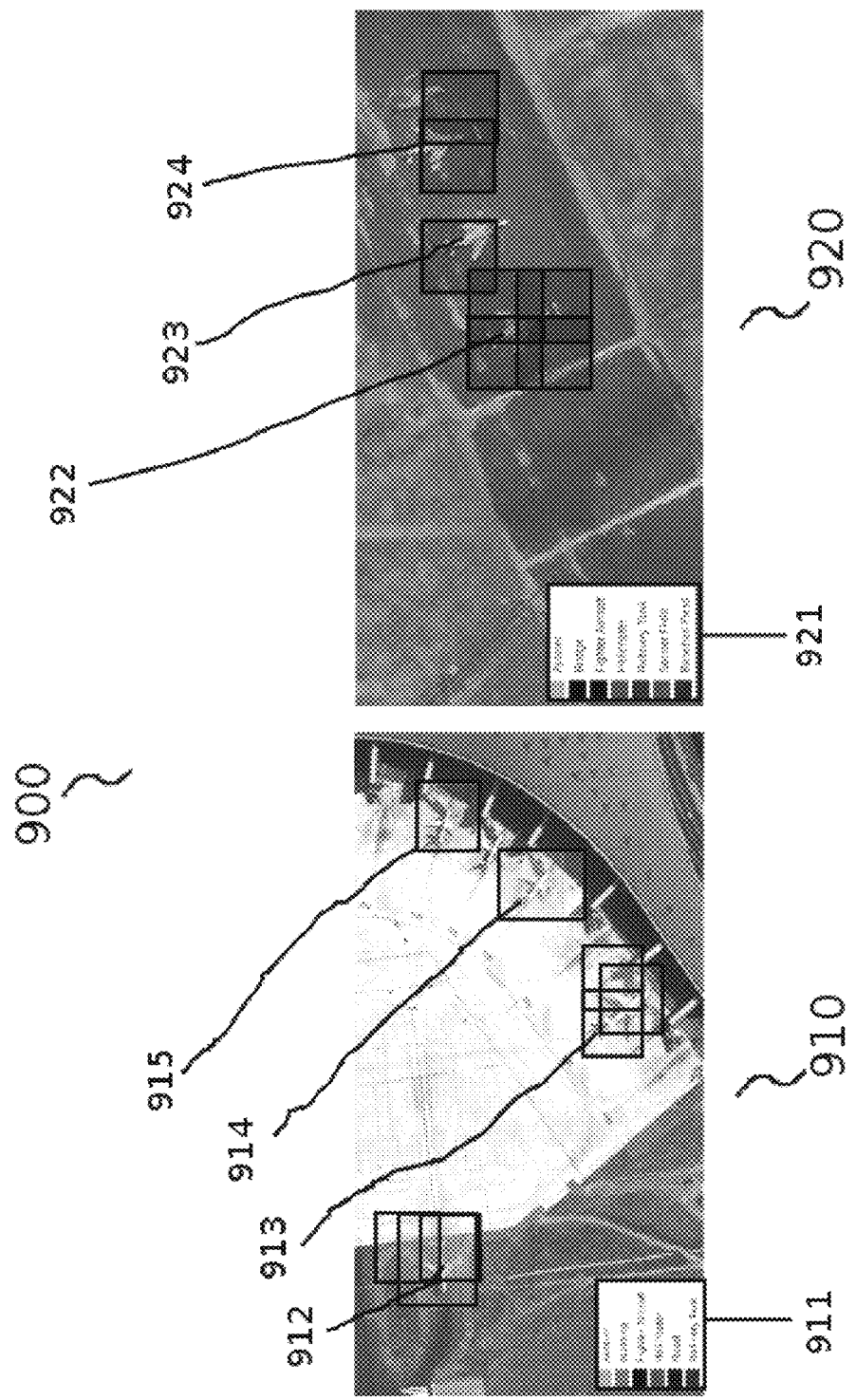
FIG. 9 is made up of two panels which show examples of trained image analysis software module identifying two types of objects of interest as part of the automated system for geospatial image analysis of the invention.

FIG. 9, consisting of a two-panel figure, 900, showing two examples of the results that might be obtained upon analysis of image segments from one or more caches of orthorectified image segments by exemplary trained image analysis software module 540 of the invention. The left panel 910 of 900 shows an orthorectified geospatial image that has been scaled and tagged with yellow to allow those who receive the report to confirm a grouping of airliner category objects 912, 913, 914, 915. The legend for this panel 911 shows that image analysis software module in one embodiment of the system was trained to identify a plurality of object categories some of which were airliner, building, fighter aircraft, helicopter, road and refinery tank. This listing is exemplary of what might be part of a particular search report of this type and does not indicate that those items encompass the entire identification repertoire of the trained image analysis software module 540 employed to generate the report as one skilled in the art will understand that the listed categories are only a small subset of possible categories that might be identified by the invention. The right panel of FIG. 9, 920, again shows an orthorectified geospatial image that has been scaled and tagged this time with purple to allow those who receive the report to confirm a grouping of fighter aircraft category objects 922, 923, 924. The legend for this panel 921 shows that image analysis software module in this embodiment of the system was trained to identify a plurality of object categories that include airliner, bridge, fighter aircraft, helicopter, refinery tank, soccer field, baseball field. As in Panel 910, this listing is meant only to be exemplary of what might be included in a particular type of search report and not to indicate that those items encompass the entire identification repertoire of trained image analysis software module 540 used in the system. That the format of the reports found in FIG. 9, an orthorectified geospatial image scaled to show individual airliners or fighter aircraft and color coded to highlight those items as objects of interest, is just one easily discerned example of report types that could be generated by the system and is meant as such. These reports can take a plurality of forms depending upon requirements of the specifications of those who perform the search. One search might produce a report made up solely of rows of numbers, one to designate the specific object of interest that has been identified, a second for and third the latitude and the longitude at which that object or objects were found. Another embodiment might use further logic to produce identify the probable function of a particular grouping of objects. A grouping of airliners within a given area might get a single tag as an airport, or a grouping of automobiles tagged as a parking lot. When the invention is used to analyze the same specific region over some period of time, a report text only, tagged image of combinations of both may be generated only to record changes in the numbers of specific items drawn from a vast plurality of categories such as tents, cars, submarines, zebra, or tree cover. The invention is not constrained or defined by any particular report type.

Figure 11:
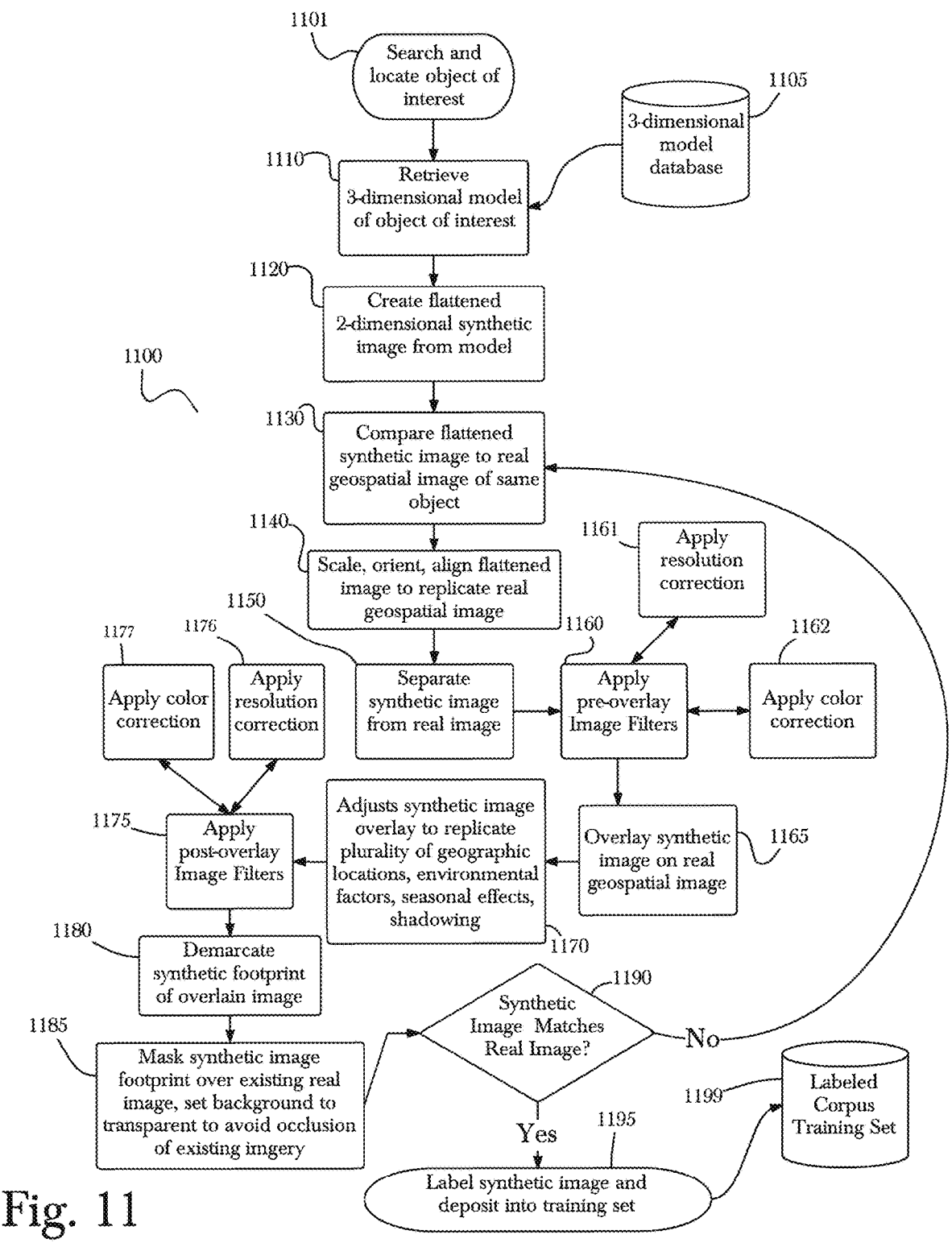
FIG. 11 is a process flow diagram of a method for synthesizing training data using a system of the invention, according to a preferred embodiment.

FIG. 11 is a process flow diagram of a method 1100 for geospatial image analysis that uses a method similar to that of 600, described above; however, the deep learning models 520, 1040 and the image analysis software 540, 1060 are combined with an image manipulation software module 1020 using a system of the invention. According to the embodiment, a search and locate function 1101 is conducted to identify and locate an object or item of interest from orthorectified geospatial imagery, regardless of whether the object is real or imaginary, so long as the searched object of interest was, is or could be, now or in the future, tangible and occupy 3-dimensional space. Method 600 is limited to searching for only objects or items which are known and have been previously identified and pre-labeled on real, existing geospatial imagery for the purpose of generating the training set for the deep learning module. Method 1100 allows for a "search and locate" action 1101 to be executed on any pre-labeled searchable object or set of objects. The search function 1101 may return data on any number of tagged, pre-labeled items from either real, pre-labeled imagery 1050 or synthetic images 1035 or synthetic imagery storage 1037 or any combination thereof. Using method 1100, a synthetic image can be generated for a specified object or item of interest, as specified in the search function 1101. Searchable objects are retrieved from a database of modeled objects 1105 in response to the search function 1101 for the object of interest. By searching the 3-dimensional database of models 1105, the image manipulation software module 1020 retrieves a 3-dimensional model 1110 of the object of interest, creates a flattened 2-dimensional synthetic image 1120 from the selected 3-dimensional model and compares 1130 the 2-dimensional synthetic image 1120 to real, geospatial imagery of the same object, such that the image manipulation software module 1020 can scale, orient, or and align the flattened 2-dimensional image to replicate 1140 the real orthorectified geospatial image. Once the synthetic image has been initially replicated 1140, the image manipulation software module 1020 separates the synthetic image layer from the real image layer, such that pre-overlay filters 1160, color correction 1162 and resolution correction 1161 may be applied for initial tuning of the synthetic image to a plurality of backgrounds. Once the pre-overlay filters 1160 have been applied to the separated synthetic image layer 1150, the module 1020 will again overlay the synthetic image on the real geospatial image 1165 before adjusting the initial image to replicate a plurality of geographic locations, environmental factors, seasonal effects, and or shadowing effects accounting for sun angle, time of day, year as well as shadowing from localized light sources 1170. Post-overlay image filters 1175, such as color correction 1177 and resolution correction, smoothing, blurring or pixelating 1176, finalize the synthetic image before a synthetic footprint is demarcated 1180. The synthetic footprint demarcation 1180 is important as it may contain not only the synthetic image but also any associated shadowing associated with the synthetic object. The demarcated synthetic image 1180 is overlain onto existing real imagery background, and using a masking function 1185 to set the background of the synthetic image to transparent such that existing imagery is not occluded. Finally, the software module 1020 runs a check 1190, to ascertain whether the synthetic image matches the pre-labeled real image, and if so, created a labeled synthetic image 1035 to be deposited into a labeled corpus training set 1037.

Figure 12:
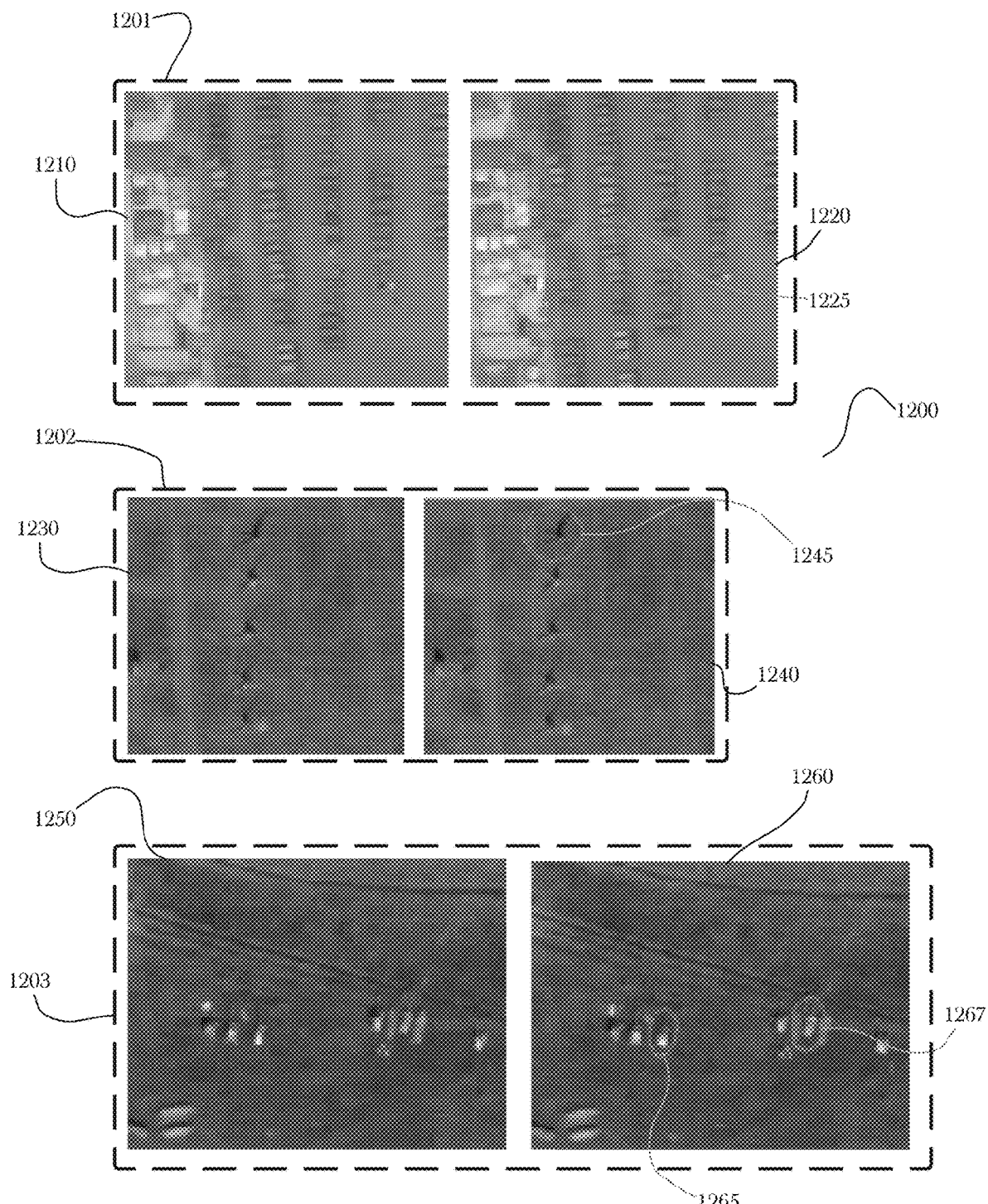
FIG. 12 depicts three pairs of images; within each pair of images, a circled object of interest on one of the images identifies a synthesized object overlain onto a real geospatial image.

FIG. 12 depicts a comparison panel 1200 comprising three pairs of images: 1201, 1202, 1203; within each pair of images, a circled object of interest 1225, 1245, 1265, 1267 on one of the images 1220, 1240, 1260 identifies a synthesized object that has been inserted. In image pair 1201, a synthetic image of a re-locatable type of object, in this case, a truck 1225 is shown on both images 1210 and 1220, with the synthetic truck 1225 being identified on image 1220. Similarly, image pair 1202 depicts a stationary item, a synthesized lattice-framed tower including its associated shadow 1245, identified on image 1240 but shown on both images in the pair 1202. Image pair 1203 illustrates a plurality of synthetic images 1265, 1267, and is provided to illustrate how more than one synthetic image may occur.

FIG. 13 comprises a panel 1300 of three images 1301, 1302, 1303 which depict a real geospatial image 1301 of a roadway intersection resembling a traffic circle; a flattened 2-dimensional synthetic image 1302 of a tractor-trailer truck, in this case, already having been manipulated from its 3-dimensional state and oriented to match a predisposed turning radius aligned with traffic flow in the traffic circle; and a synthetically manipulated geospatial image 1303 showing synthetic image 1302 scaled, aligned, masked and overlain onto geospatial image 1301 merged into synthetic image overlay area 1330. Area 1310 on real image 1301 is demarcated for comparison to identify the area 1330 in which synthetic image 1302 is placed. Real vehicle 1320 is identified on image 1301 as reference for scale and alignment of vehicles within the circle, as well as associated shadowing. As in the case of synthetic image overlay 1330, shadowing of the synthetic tractor-trailer truck 1302 has not been applied.

The skilled person will be aware of a range of possible modifications of the various embodiments described above. Accordingly, the present invention is defined by the claims and their equivalents.

What is claimed is:

1. A system for broad area geospatial object detection using synthetically-generated training images for improved training of a deep learning model comprising a computing device comprising a processor, a memory, and a plurality of programming instructions stored in the memory and operable on the processor, wherein the plurality of programming instructions:
    (a) retrieves a digital model of an object of interest from a data store;
    (b) creates a flattened image from the retrieved digital model;
    (c) compares the flattened image to a real geospatial image comprising an instance of the object of interest and associated background;
    (d) creates a plurality of shadowed, modified flattened images for the object of interest as if it were physically located and oriented where it would be affected by real-time and real-world shadowing;
    (e) adjusts the shadowed, modified flattened images to resemble the real image;
    (f) identifies and demarcates a footprint associated with each of the shadowed, modified flattened images;
    (g) overlays the demarcated footprint onto a real image;
    (h) generates a labeled corpus of manipulated synthetic training data comprising at least a portion of the modified flattened images; and
    (i) trains a deep learning model comprising a convolutional neural network to recognize objects of the same type as the object of interest in geospatial images.

2. The system of claim 1, further comprising an image analysis server comprising a second processor, a second memory, and a second plurality of programming instructions stored in the second memory and operable on the second processor, wherein the second plurality of programming instructions:
    (a) uses the deep learning model to automatically identify and label all objects of interest in a received data set comprising a plurality of unanalyzed orthorectified geospatial imagery; and
    (b) outputs the locations of the identified objects of interest.

3. A method for identifying objects of interest in geospatial images using a deep learning model and synthetically-generated training images the method comprising the steps of:
    (a) automatically generating, using an image manipulation computer, a flattened image of an object of interest from a digital model of the object of interest;
    (b) manipulating the flattened image to create a plurality of synthetic images comprising at least one of the object of interest, placing the object of interest in the plurality of synthetic images in a plurality of locations, environments, orientations, scales, exposures, and foci in order to create a large corpus of synthetically-generated training images;
    (c) training, using the large corpus of synthetically-generated training images, a deep learning model comprising a convolutional neural network to recognize objects of the same type as the object of interest in a plurality of unlabeled geospatial images;
    (d) analyzing the plurality of unlabeled geospatial images using the deep learning model to identify objects of interest.

* * * * *